(12) United States Patent
Asai et al.

(10) Patent No.: US 9,483,578 B2
(45) Date of Patent: Nov. 1, 2016

(54) COMPUTER-READABLE STORAGE MEDIUM STORING UPDATE PROGRAM, UPDATE METHOD, AND UPDATE DEVICE

(71) Applicant: FUJITSU LIMITED, Kawasaki-shi, Kanagawa (JP)

(72) Inventors: Tatsuya Asai, Kawasaki (JP); Takashi Katoh, Yokohama (JP); Hiroaki Morikawa, Kawasaki (JP); Shinichiro Tago, Shinagawa (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 521 days.

(21) Appl. No.: 13/762,805

(22) Filed: Feb. 8, 2013

(65) Prior Publication Data

US 2013/0325842 A1    Dec. 5, 2013

(30) Foreign Application Priority Data

May 29, 2012   (JP) ................. 2012-122499

(51) Int. Cl.
*G06F 7/00*   (2006.01)
*G06F 17/30*   (2006.01)

(52) U.S. Cl.
CPC ... *G06F 17/30935* (2013.01); *G06F 17/30501* (2013.01); *G06F 17/30908* (2013.01); *G06F 17/30961* (2013.01)

(58) Field of Classification Search
CPC .............. G06F 17/30908; G06F 17/30961; G06F 17/30929; G06F 17/30938; G06F 17/30958; G06F 17/30935

USPC ............ 707/716, 2, 999.003, 741, 999.006, 707/999.1

See application file for complete search history.

(56) References Cited

U.S. PATENT DOCUMENTS

| | | | |
|---|---|---|---|
| 2005/0044070 A1* | 2/2005 | Nagata et al. | 707/3 |
| 2007/0282835 A1* | 12/2007 | Duxbury | G06F 17/30958 |
| 2009/0083294 A1* | 3/2009 | Gao | G06F 17/2229 |
| 2010/0005058 A1* | 1/2010 | Tago et al. | 707/2 |
| 2010/0250551 A1* | 9/2010 | Kamimura et al. | 707/741 |

FOREIGN PATENT DOCUMENTS

| | | |
|---|---|---|
| JP | 2003-323429 | 11/2003 |
| WO | WO 2008/117454 A1 | 10/2008 |

* cited by examiner

*Primary Examiner* — James Trujillo
*Assistant Examiner* — John J Morris
(74) *Attorney, Agent, or Firm* — Oblon, McClelland, Maier & Neustadt, L.L.P.

(57) ABSTRACT

A computer-readable storage medium storing an update program that causes a computer to execute a process includes: acquiring an automaton performing matching of data in an input stream hierarchized by tags to a keyword in a query, the automaton in which an initial state, a start state indicating a start tag symbol, an end state indicating an end tag symbol, a transition between the initial state and the start state, a transition between the initial state and the end state, and a transition from the initial state to the initial state are defined; generating a path identifying the position of a start tag based on a hierarchy in the input stream when the start tag is read from the input stream; judging whether or not the generated path meets a condition corresponding to the keyword in the query; generating, when the generated path is judged to meet a condition.

11 Claims, 34 Drawing Sheets

| PATH ID | PATH | FLAG |
|---|---|---|
| 1 | /tap | 1 |
| 2 | /tap/tap ID | 1 |
| 3 | /tap/socket | 1 |
| 4 | /tap/socket/power | 1 |
| 5 | /tap/socket/apparatus name | 1 |
| 6 | /tap/socket/socket | 0 |
| 7 | /tap/socket/socket/apparatus name | 1 |
| 8 | /tap/socket/socket/power | 1 |

TRANSITION DESTINATION OF "["

TRANSITION DESTINATION OF "["

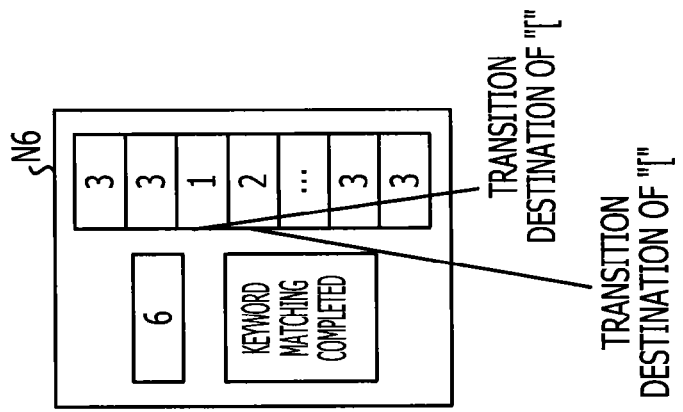
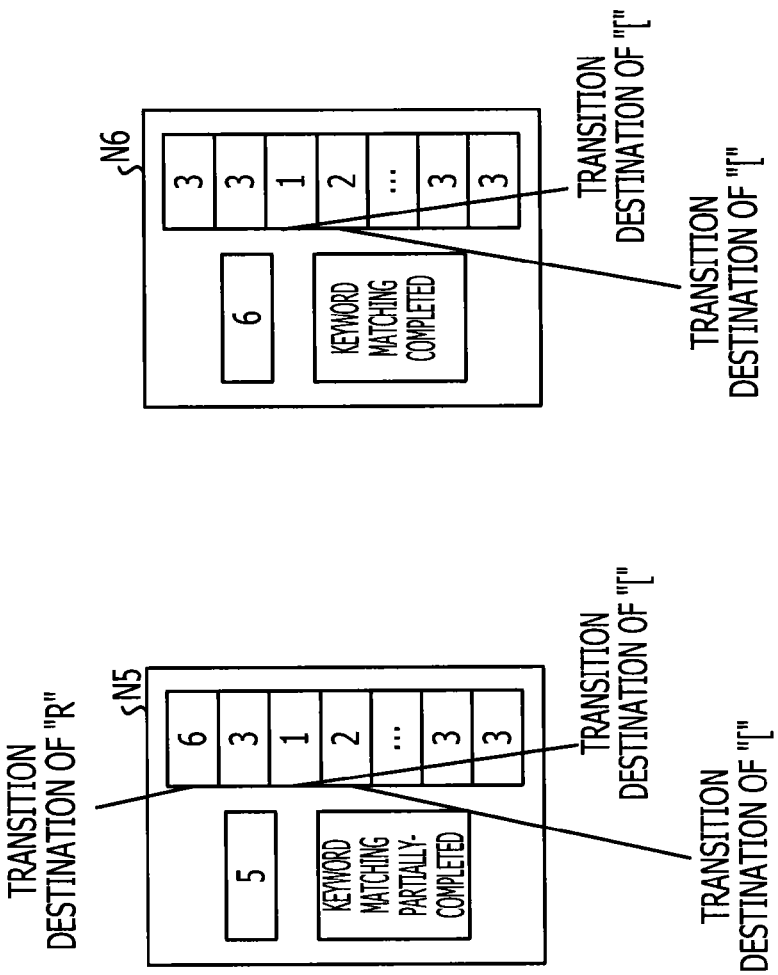
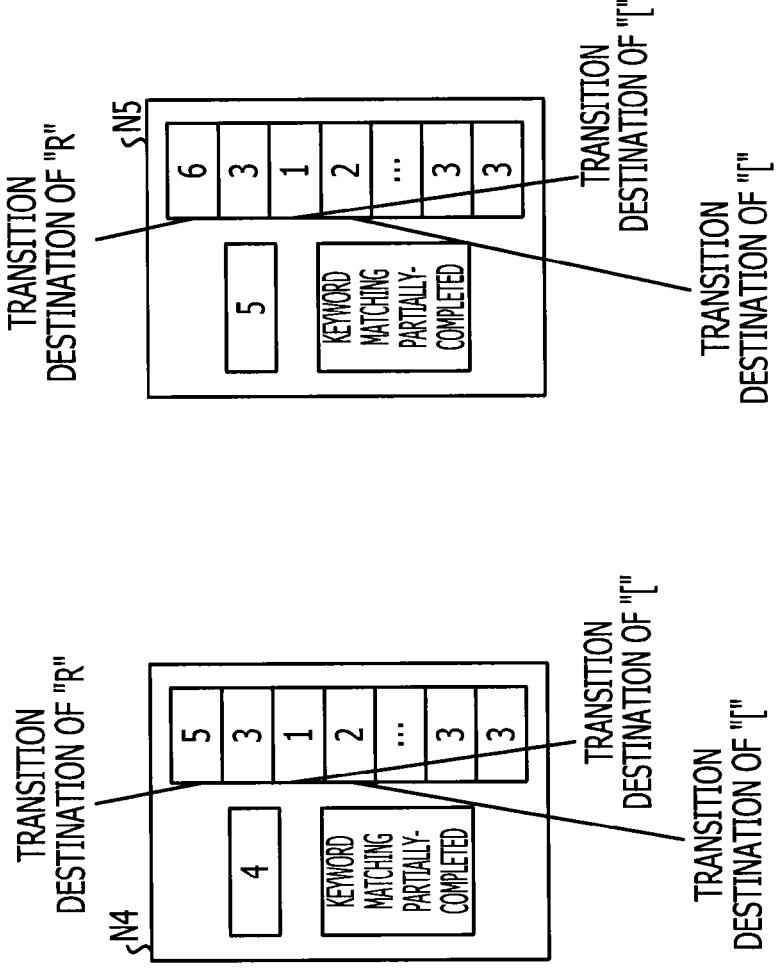

COMPUTER-READABLE STORAGE MEDIUM STORING UPDATE PROGRAM, UPDATE METHOD, AND UPDATE DEVICE

CROSS-REFERENCE TO RELATED APPLICATION

This application is based upon and claims the benefit of priority of the prior Japanese Patent Application No. 2012-122499, filed on May 29, 2012, the entire contents of which are incorporated herein by reference.

FIELD

The embodiment discussed herein is related to an update program, an update method, and an update device.

BACKGROUND

In the past, International Publication Pamphlet No. WO 2008/117454 that generates a path/keyword matching automaton by replacing a tag of input extensible markup language (XML) data with a path ID for identifying a path in a path schema has been disclosed. Moreover, Japanese Laid-open Patent Publication No. 2003-323429 that generates a simple API for XML (SAX) event from input XML data and updates a path matching automaton in accordance with the generated SAX event has been disclosed.

SUMMARY

A computer-readable storage medium storing an update program that causes a computer to execute a process includes: acquiring an automaton performing matching of data in an input stream hierarchized by tags to a keyword in a query, the automaton in which an initial state, a start state indicating a start tag symbol, an end state indicating an end tag symbol, a transition between the initial state and the start state, a transition between the initial state and the end state, and a transition from the initial state to the initial state are defined; generating a path identifying the position of a start tag based on a hierarchy in the input stream when the start tag is read from the input stream; judging whether or not the generated path meets a condition corresponding to the keyword in the query; generating, when the generated path is judged to meet a condition corresponding to the keyword in the query, a path matched state indicating that the path meets the condition, a transition from the start state to the path matched state when a character string in the start tag is scanned in the start state, a transition from the path matched state when the keyword is scanned in the path matched state, a transition destination state by the transition, a transition from the path matched state to the start state when the start tag symbol is scanned in the path matched state, and a transition from the path matched state to the end state when the end tag symbol is scanned in the path matched state; and updating the automaton.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIGS. 16A to 16C are diagrams describing examples of the node structures of a keyword matching partially-completed state and a keyword matching completed state;

DESCRIPTION OF EMBODIMENT

Hereinafter, an embodiment of an update program, an update device, and an update method according to the present disclosure will be described with reference to the attached drawings. Incidentally, in this embodiment, "A" is used as a character denoting an automaton, but characters "A0", "A1", and "A2" are sometimes used to specify an update state. "A0" is a character denoting an initial automaton, "A1" is a character denoting the automaton after a first update, and "A2" is a character denoting the automaton after a second update.

Example of an Automaton Update

Figure 1:
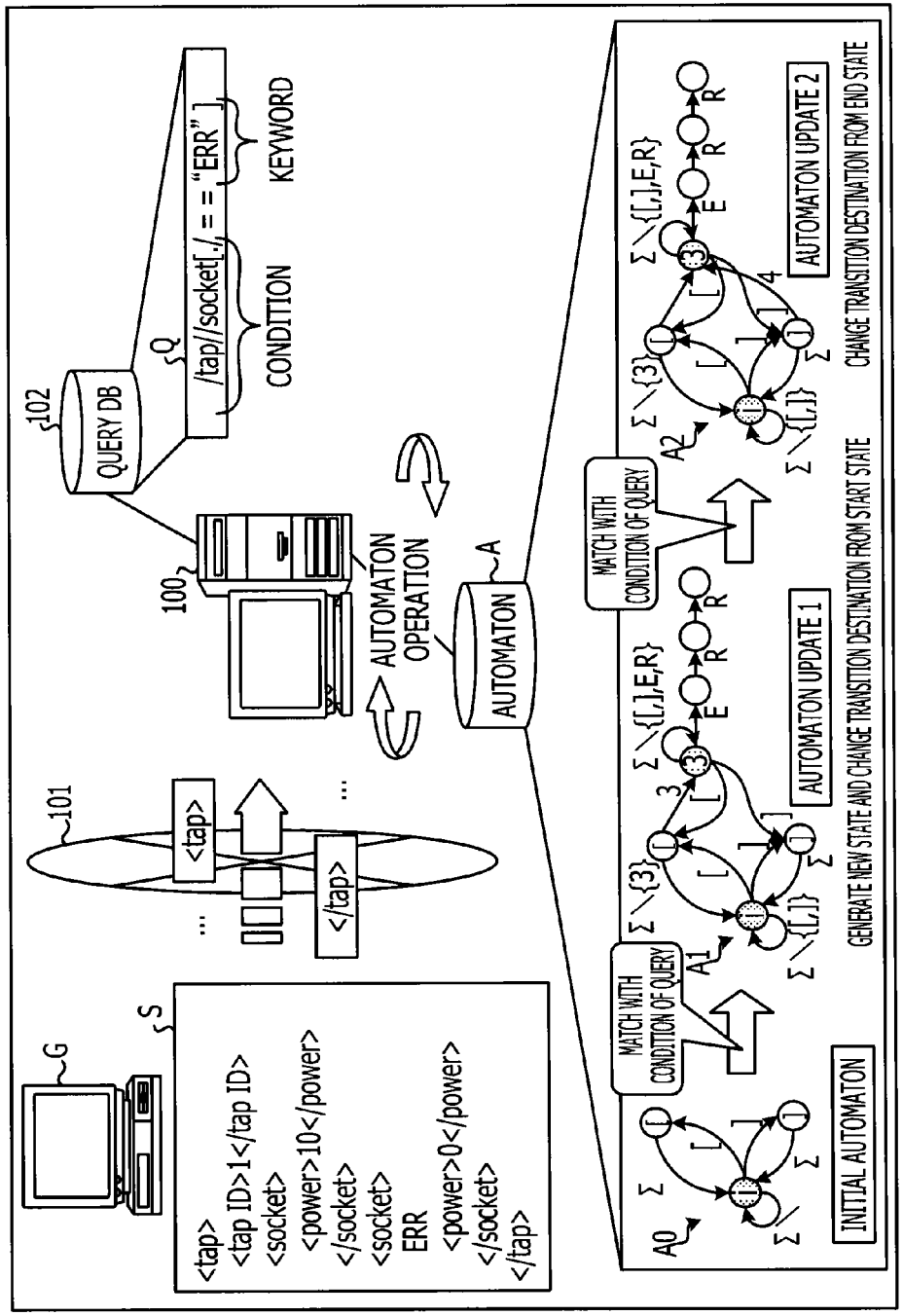
FIG. 1 is a diagram illustrating an example of an automaton update according to an embodiment.

FIG. 1 is a diagram illustrating an example of an automaton update according to this embodiment. In this embodiment, as illustrated in FIG. 1, by performing updating of an automaton A in such a way that portions of an initial automaton (referred to below as an initial automaton A0) which are desired for matching are updated in a step-by-step manner, an update device 100 is able to allocate time for updating of a portion which is not used at the present stage to scanning of the automaton A. This makes it possible to suppress a delay in matching processing by the automaton A. Specific descriptions will be given below.

The above-mentioned updating of the automaton A is performed by the update device 100. The update device 100 stores a query database (DB) 102 and the automaton A. The query DB 102 is a database storing a query Q. The query Q includes a data matching condition and a keyword that is output when the condition is met. The update device 100 receives, from a computer that is a generation source G of an input stream S hierarchized by tags, an input stream S via a network 101. Examples of the input stream S include XML data and hypertext markup language (HTML) data; in this example, descriptions will be given by taking up XML data as an example.

The input stream S is hierarchized by tags. In the input stream S of FIG. 1, <tap> and </tap> are tags in the first hierarchy in a topmost position. Moreover, <tap ID> and </tap ID> are tags in the second hierarchy. Furthermore, <socket> and </socket> are also tags in the second hierarchy. In addition, <power> and </power> are tags in the third hierarchy in an undermost position.

The update device 100 starts reading from the head of the input stream S, and performs keyword matching while scanning the automaton A. In this embodiment, a channel from an in-tag character string in a top hierarchy to an in-tag character string which has just read is referred to as a "path". For example, when a start tag <tap ID> is read, a channel from "tap" of <tap> of the first hierarchy to "tap ID" of <tap ID> of the second hierarchy is a path of the start tag <tap ID>. Moreover, when a start tag <power> is read, a channel from "tap" of <tap> of the first hierarchy to "power" of <power> of the third hierarchy via "socket" of <socket> of the second hierarchy is a path of the start tag <power>.

The update device 100 determines whether or not the path of the tag that has just read meets the condition of the query Q. The condition of the query Q of FIG. 1 is "/tap//socket". This means a path from "tap" of <tap> of the first hierarchy to "socket" of <socket> of an arbitrary hierarchy. When the path of the tag that has just read meets the condition of the query Q, the update device 100 updates the automaton A. Here, "//" indicates that there may be an arbitrary number of hierarchies.

The initial automaton A0 has an initial state, a start state, and an end state. The start state is a state corresponding to "< >" which is a start tag symbol of a start tag. In this example, the start tag symbol "< >" is converted into "[". The end state is a state corresponding to "</>" which is an end tag symbol of an end tag. In this example, the end tag symbol "</>" is converted into "]". The initial automaton A0 further has a transition between the initial state and the start state, a transition between the initial state and the end state, and a transition in which the initial state loops.

In the first updating of the automaton A, the update device 100 generates a new state corresponding to a path that has met the condition of the query Q. The generated new state is referred to as a "path matched state". To the path matched state, a path ID unique to a path that has met the condition of the query Q is assigned. In the example of FIG. 1, "3" is assigned to the path matched state.

Moreover, in the first updating of the automaton A, the update device 100 changes a transition destination from the start state. Specifically, the update device 100 generates a transition from the start state to the path matched state, a transition from the path matched state to the start state or the end state, a transition from the path matched state to the keyword in the query Q, and transition destination states thereof. In this example, as the keyword of the query Q, "ERR" is registered.

The update device 100 generates a first transition "E" from the path matched state and a first transition destination state thereof, a second transition "R" from the first transition destination state and a second transition destination state thereof, and a third transition "R" from the second transition destination state and a third transition destination state thereof to make it possible to perform matching to the keyword of the query Q when the "ERR" is read when the scanning position of the input stream S is in the path matched state. This is the end of the first updating of the automaton A.

In the first updating of the automaton A, a transition from the end state to the path matched state is not generated. The scanning by the automaton A is possible even in a state in which there is no transition from the end state to the path matched state until the scanning by this transition is desired. As a result, since it does not have to stop scanning to generate a transition from the end state to the path matched state, it is possible to suppress a delay in matching processing.

When a transition from the end state to the path matched state is desired for scanning after the first updating of the automaton A, the update device 100 changes a transition destination from the end state. Specifically, the update device 100 performs the second updating of the automaton A by generating a transition from the end state to the path matched state. In the second updating of the automaton A, when the scanning position is in the end state, the update device 100 determines whether or not a path matched with the query Q is a master path of a path to an in-tag character string of the end tag. Specifically, when a path obtained by deleting an in-tag character string of the end tag from a path to an in-tag character string of the end tag is the same as the path matched with the query Q, the path matched with the query Q is a master path. When the path matched with the query Q is a master path, a transition destination from the end state is a path matched state. Therefore, after the master path is detected, a transition destination from the end state is changed.

As described above, of three types of automaton update processing: "generation of a new state", "change of a transition destination from the start state", and "change of a transition destination from the end state", the update device 100 does not perform "change of a transition destination from the end state" until an end tag is detected. This makes it possible to distribute the load of automaton update processing and reduce a processing delay time.

Example of Matching of the Input Stream S to the Query Q

Figure 2:
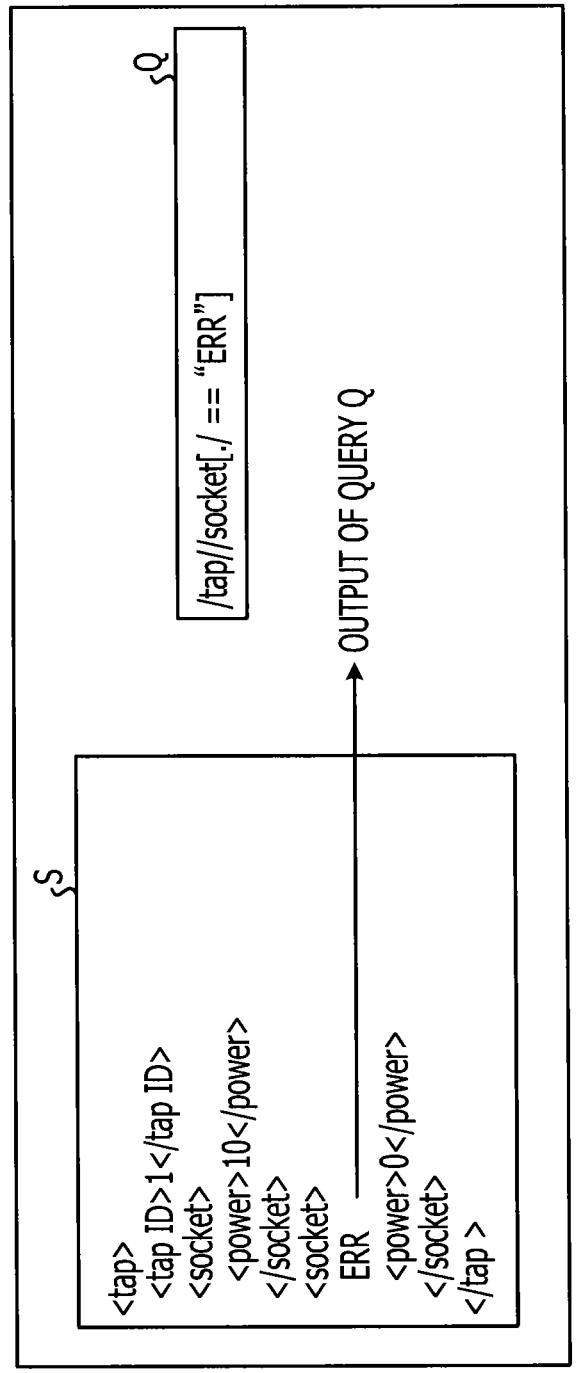
FIG. 2 is a diagram illustrating an example of matching of an input stream to a query.

FIG. 2 is a diagram illustrating an example of matching of the input stream S to the query Q. When a character string "ERR" of the query Q is included in "socket" present in a record whose first hierarchy is "tap" in the input stream S, the character string "ERR" is output from the update device 100 as a matching result.

Figure 3:
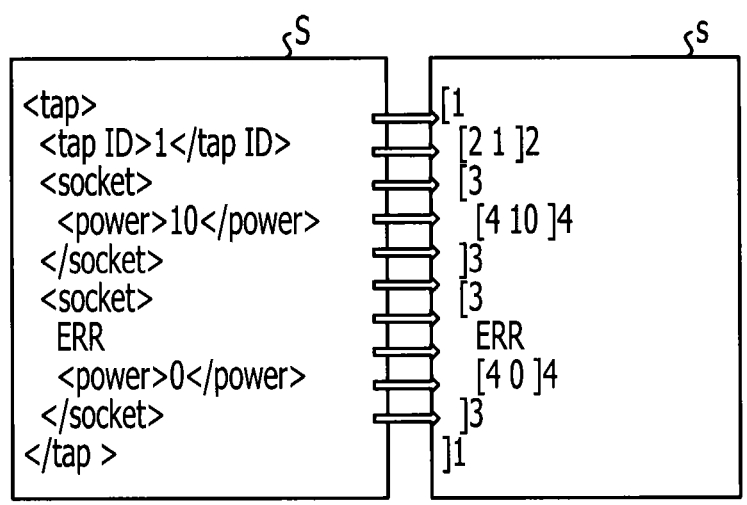
FIG. 3 is a diagram illustrating an example of conversion of the input stream.

FIG. 3 is a diagram illustrating an example of conversion of the input stream S. The update device 100 reads the input stream S sequentially from leading <tap> to </tap> at the end of the input stream S. The update device 100 converts the tags. As a result, the tags are compressed, making it possible to reduce the automaton A. In the example of FIG. 3, the start tag symbol "< >" is converted into "[". Moreover, the end tag symbol "</>" is converted into "]". Furthermore, each in-tag character string is converted into a unique number. In this example, the in-tag character strings are converted into "1", "2", . . . in the order in which they are read. For example, "tap" is converted into "1", "tap ID" is converted into "2", "socket" is converted into "3", and "power" is converted into "4". Incidentally, the converted input stream S is referred to as a "converted stream s".

Figure 4:
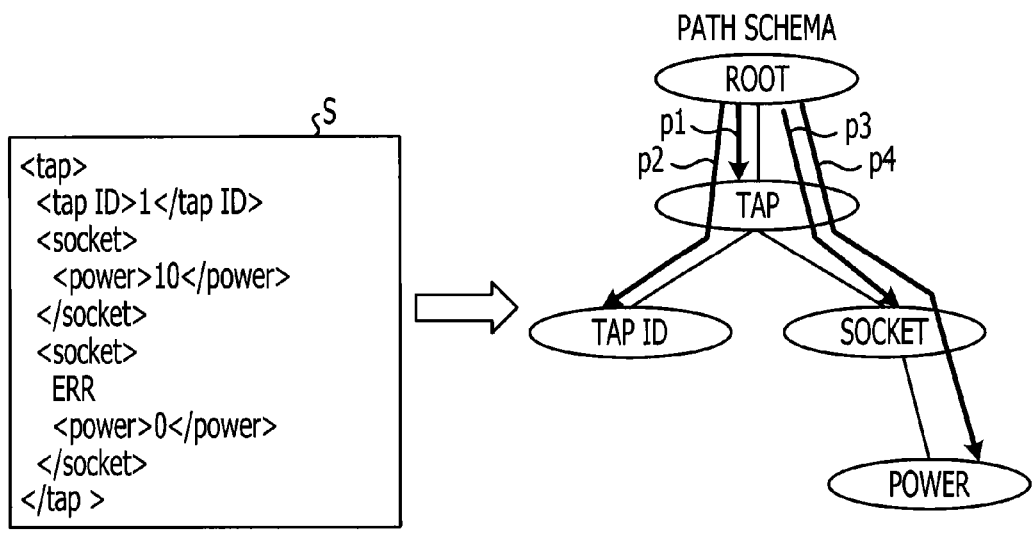
FIG. 4 is a diagram illustrating a path of the input stream.

FIG. 4 is a diagram illustrating a path of the input stream S. The path is information indicating a channel to each tag in the input stream S in accordance with the hierarchy of the input stream S. In this example, to facilitate the understanding, for convenience sake, the path is described by using a path schema of the input stream S. However, the update device 100 does not recognize the structure of the input stream S until the update device 100 reads the input stream S and analyzes the input stream S.

The path schema is a tree structure indicating the hierarchical structure of the input stream S from a root indicating the zeroth hierarchy. In the input stream S of this example, "tap" is the first hierarchy, "tap ID" and "socket" are the second hierarchy, and "power" is the third hierarchy. A channel from the root to "tap" of the first hierarchy is a path p1, a channel from the root to "tap ID" is a path p2, a channel from the root to "socket" is a path p3, and a channel from the root to "power" is a path p4.

The numerals assigned to the paths p1 to p4 correspond to the unique numbers converted in FIG. 3. Specifically, a path p# (# is a numeral) is a path to an in-tag character string converted into #. For example, the path p2 is a path to the in-tag character string "tap ID" converted into "2". Moreover, the path p4 is a path to the in-tag character string "power" converted into "4". Numeral # is a path ID which will be described later. The update device 100 detects a path having, at the end thereof, a tag that is being read while reading the input stream S.

Figure 5:
FIG. 5 is a diagram illustrating an example of a path ID control table.

FIG. 5 is a diagram illustrating an example of a path ID control table. The path ID control table T is a table controlling the path ID. The path ID control table T has a path ID item, a path item, and a flag item, and a value of each item is stored as a record for each path. By default, the path ID control table T contains no record. In the path ID item, a path ID is stored. The path ID is identification information for uniquely identifying a path and corresponds to # described above. In the path item, a path is stored. For example, in the case of the path p4 with a path ID: 4, "/tap/socket/power" is stored.

In the flag item, a flag is stored. The value of the flag is "1" or "0". By default, the value of the flag is "0". The flag is an identifier indicating whether or not a tag reached through a path appears in the input stream S even once as an end tag. If the tag reached through the path does not appear in the input stream S as an end tag, the flag is set at "0", and, when the tag reached through the path appears in the input stream S even once as an end tag, the flag is set at "1". For example, when the start tag <tap ID> appears during reading of the input stream S, the update device 100 detects the path p2 and registers a path ID: 2 and the path p2 (/tap/tap ID) in a new record of the path ID control table T. Then, when the end tag </tap ID> appears, the update device 100 changes the flag of the path p2 from "0" to "1".

In this manner, a record is added to the path ID control table T every time a path is detected, and, when the end tag thereof is detected, the flag is changed. This makes it possible to detect the path of the start tag read immediately after the end tag by tracing the path from the hierarchy next above the hierarchy of the path of the end tag. For example, the start tag <socket> appears after the end tag </tap ID> of the path p2. Therefore, by tracing the path to <socket> after returning to <tap> in the hierarchy next above the hierarchy of the path p2, it is possible to detect the path p3.

Figure 6A:
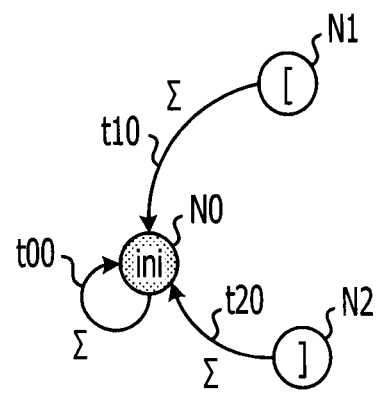
FIGS. 6A and 6B are diagrams describing an example of the construction of an initial automaton.
Figure 6B:
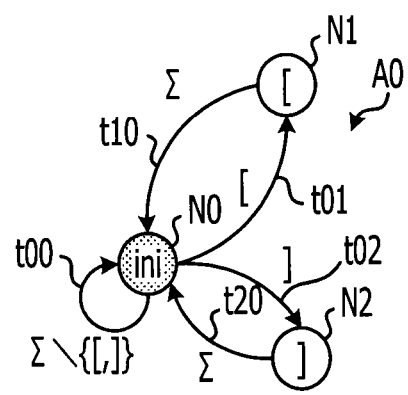

FIGS. 6A and 6B are diagrams describing an example of the construction of the initial automaton A0. As illustrated in FIG. 1, the update device 100 stores the initial automaton A0. Since it is possible to apply the initial automaton A0 to any input stream S, the initial automaton A0 simply has to be constructed at a certain time point and stored in the update device 100. When the initial automaton A0 is not constructed, in FIG. 6A, the update device 100 generates an initial state N0, a start state N1 indicating the start tag symbol "[" converted from the start tag symbol "< >", and an end state N2 indicating the end tag symbol "]" converted from the end tag symbol "</>". Then, the update device 100 generates a transition t00 which is a loop of the initial state N0 itself, a transition t10 from the start state N1 to the initial state N0, and a transition t20 from the end state N2 to the initial state N0. Here, "Σ" indicates all the symbols. Incidentally, in characters txy denoting a transition in FIGS. 6A and 6B and subsequent drawings, x indicates a state ID of a state from which a transition starts and y indicates a state ID of a state of a transition destination.

In FIG. 6B, the update device 100 deletes "[" and "]" from the transition t00 which is a loop of the initial state N0 itself, and generates a transition t01 from the initial state N0 to the start state N1 and a transition t02 from the initial state N0 to the end state N2. In this way, the initial automaton A0 is constructed. The initial automaton A0 thus constructed is stored in a storage area in the update device 100 and is read therefrom every time reception of the input stream S is started.

Figure 7:
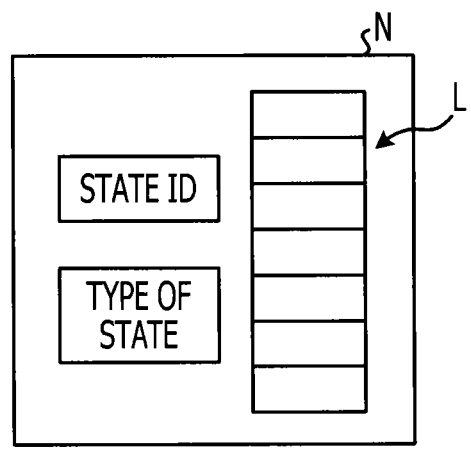
FIG. 7 is a diagram illustrating an example of a node structure.

FIG. 7 is a diagram illustrating an example of a node structure. A node structure N is a data structure storing the features of the state of the automaton A. Specifically, the node structure N stores, for each state, a state ID, the type of state, and a list L. The state ID is an identification state uniquely identifying a state. To each state, unique identification information is assigned as a state ID. The type of state is attribute information identifying what type of state the state is. For example, as the type of state, there are the "initial state", the "start state", and the "end state" which have been described earlier. In addition to these states, there are a "path matched state", a "keyword matching partially-completed state", and a "keyword matching completed state". The "path matched state", the "keyword matching partially-completed state", and the "keyword matching completed state" will be described later.

The list L is a data structure retaining a transition identifying a transition destination state of a state. Specifically, in the list L, an area for each symbol is prepared, and a state ID of a transition destination state is stored in the area. Hereinafter, in FIGS. 8A to 8C, the node structures N of the states forming the initial automaton A0 are illustrated.

Figure 8A:
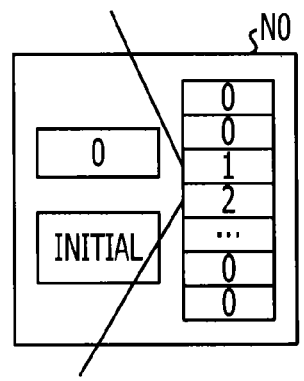
FIGS. 8A to 8C are diagrams describing an example of a node structure in each state in the initial automaton.
Figure 8B:
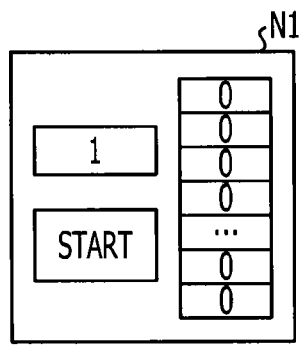
Figure 8C:
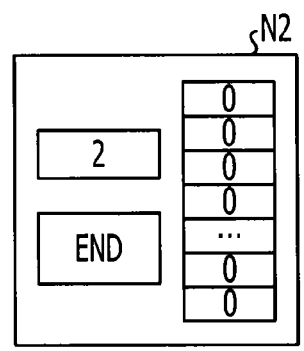

FIGS. 8A to 8C are diagrams describing an example of the node structures N of the states in the initial automaton A0. In FIGS. 8A to 8C, the node structure N of the initial state N0 is illustrated in FIG. 8A, the node structure N of the start state N1 is illustrated in FIG. 8B, and the node structure N of the end state N2 is illustrated in FIG. 8C.

In FIG. 8A, the state ID of the initial state N0 is "0". Moreover, since the state is the initial state N0, the type of state is "initial". Furthermore, since a transition to the start state N1 takes place when "[" appears in the initial state N0, in the area of the list L for the symbol "[", the state ID: 1 of the start state N1 is stored. Likewise, since a transition to the end state N2 takes place when "]" appears in the initial state N0, in the area of the list L for the symbol "]", the state ID: 2 of the end state N2 is stored. Moreover, for each of "Σ\{[,]}" of all the symbols denoted by Σ except for "[" and "]", since the initial state N0 loops, the state ID: 0 of the initial state N0 is stored in each of the areas for the symbols "Σ\{[,]}".

In FIG. 8B, the state ID of the start state N1 is "1". Moreover, since the state is the start state N1, the type of state is "start". Furthermore, since a transition to the initial state N0 takes place when any of the symbols of all the symbols denoted by Σ appears in the start state N1, the state ID: 0 of the initial state N0 is stored in the areas of the list L for the symbols.

In FIG. 8C, the state ID of the end state N2 is "2". Moreover, since the state is the end state N2, the type of state is "end". Furthermore, since a transition to the initial state N0 takes place when any of the symbols of all the symbols denoted by Σ appears in the end state N2, the state ID: 0 of the initial state N0 is stored in the areas of the list L for the symbols.

Example of Operation of the Automaton A

Next, an example of operation of the automaton A will be described specifically. In the following drawings, a banner indicates the current position of the automaton A and a thick arrow indicates scanning.

Figure 9:
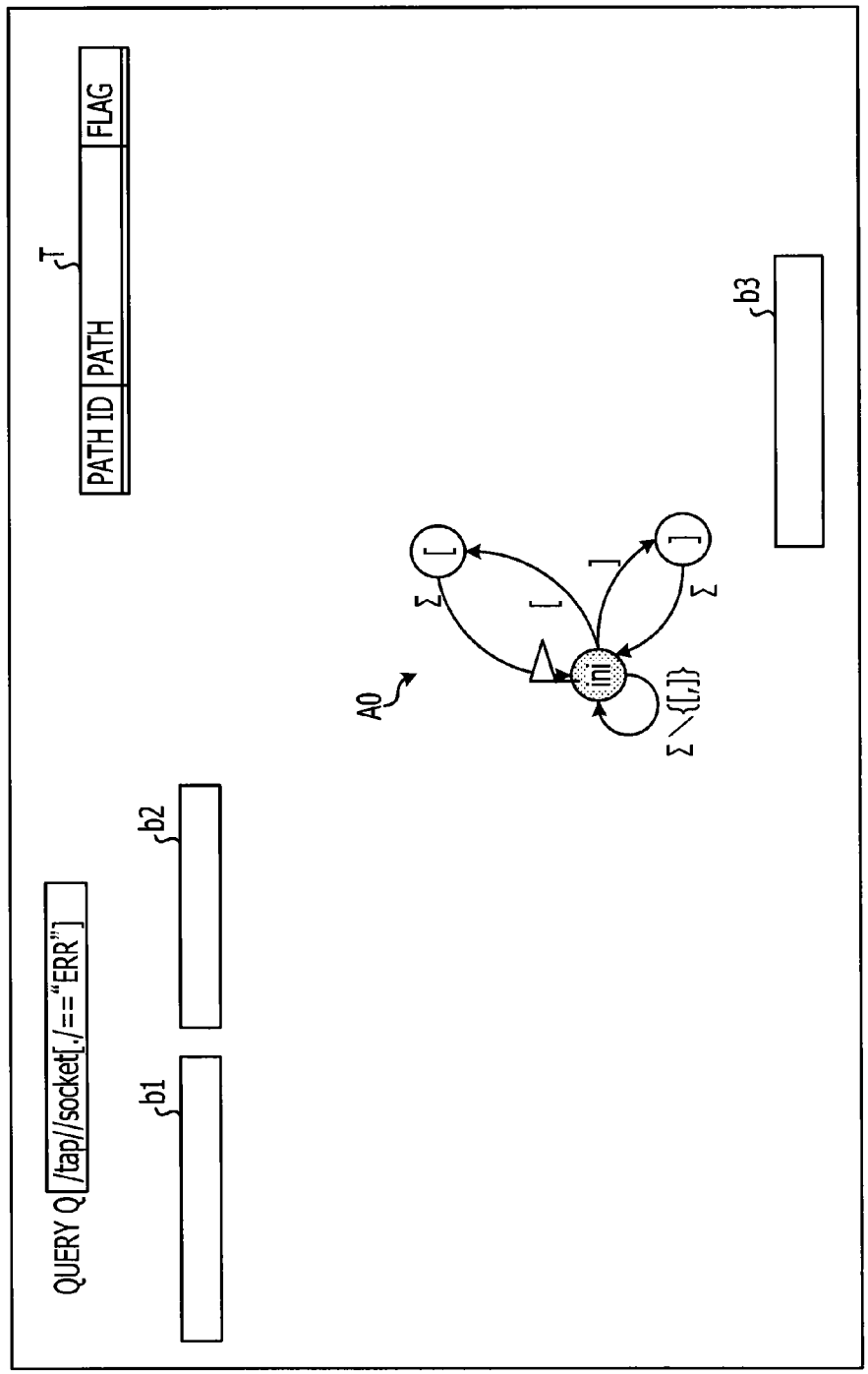
FIG. 9 is a diagram illustrating an example of operation (I) of an automaton.

FIG. 9 is a diagram illustrating an example of operation (I) of the automaton A. FIG. 9 illustrates a state before scanning of the initial automaton A0 is started. In FIG. 9, the query Q and the initial automaton A0 are prepared. Moreover, a first buffer b1 in which each input data of the input stream S is to be stored and a second buffer b2 in which converted input data converted from the input data is to be stored are empty. Furthermore, in a third buffer b3, the current path is registered. Since FIG. 9 illustrates a state before scanning, the third buffer b3 is also empty. In addition, no record is present in the path ID control table T.

Figure 10:
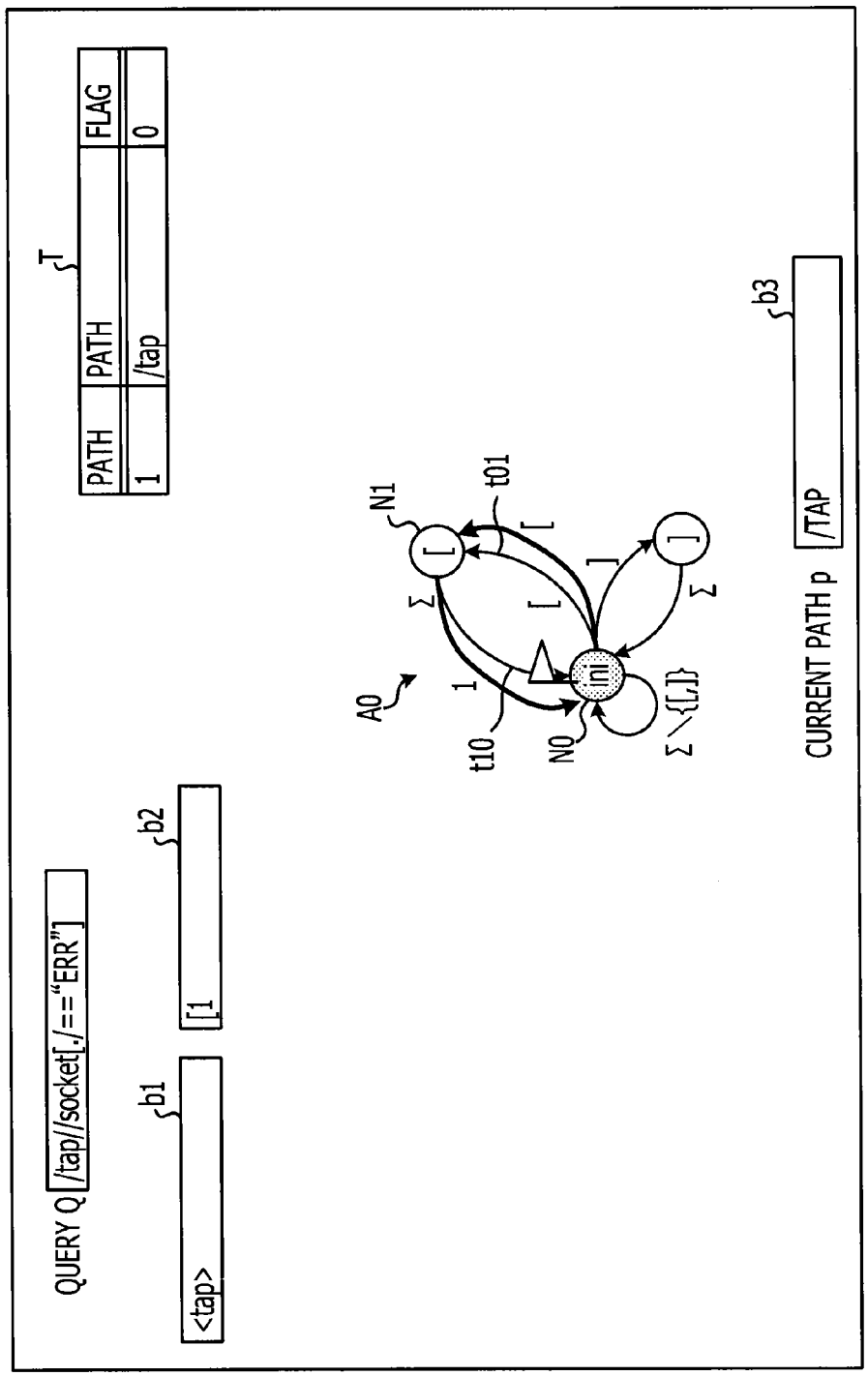
FIG. 10 is a diagram illustrating an example of operation (II) of the automaton.

FIG. 10 is a diagram illustrating an example of operation (II) of the automaton A. FIG. 10 illustrates processing that is performed when the start tag <tap> which is the leading data of the input stream S is received from the state of FIG. 9. When the start tag <tap> which is the leading data of the input stream S is written into the first buffer b1, the update device 100 reads <tap> and converts <tap> into "[1" and writes "[1" into the second buffer b2. Moreover, since the start tag <tap> has been received, the update device 100 detects "/tap" as the current path p and writes "/tap" into the third buffer b3. Then, the update device 100 registers a record indicating that a path ID is 1, a path in the third buffer b3 is "/tap", and a flag is 0 in the path ID control table T. Since the path p1 in the third buffer b3 does not meet the condition of the query Q, the update device 100 performs scanning from the initial state N0 which is the scanning position to the start state N1 in accordance with "[" in the second buffer b2, and performs scanning from the start state N1 to the initial state N0 in accordance with "1" in the second buffer b2.

Figure 11:
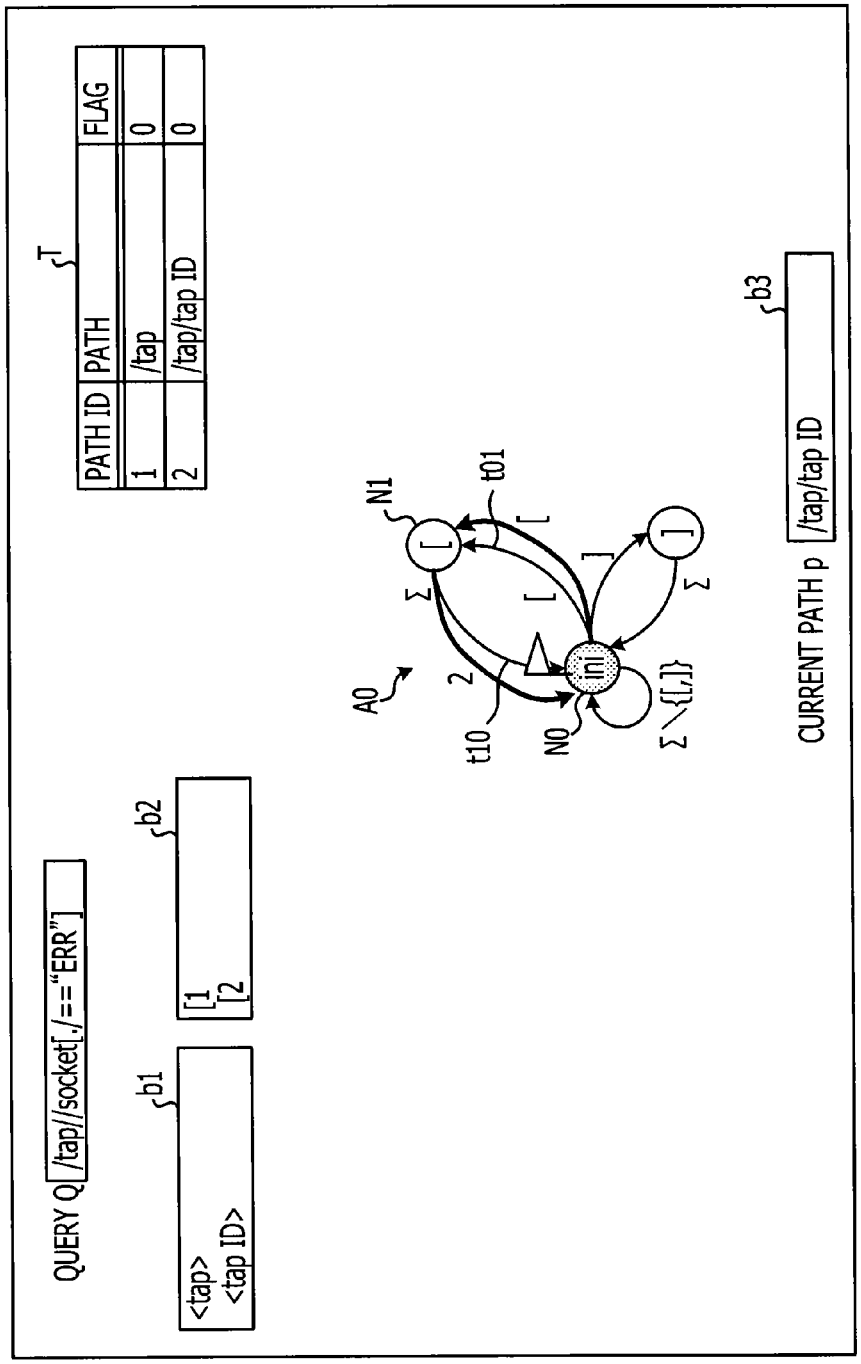
FIG. 11 is a diagram illustrating an example of operation (III) of the automaton.

FIG. 11 is a diagram illustrating an example of operation (III) of the automaton A. FIG. 11 illustrates processing that is performed when the start tag <tap ID> of the input stream S is received from the state of FIG. 10. When the start tag <tap ID> of the input stream S is written into the first buffer b1, the update device 100 reads <tap ID>, converts <tap ID> into "[2", and writes "[2" into the second buffer b2. Moreover, since the start tag <tap ID> has been received, the update device 100 writes "/tap ID" to the end of "/tap" in the third buffer b3. Then, the update device 100 registers a record indicating that a path ID is 2, a path in the third buffer b3 is "/tap/tap ID", and a flag is 0 in the path ID control table T. Moreover, since the path p2 in the third buffer b3 does not meet the condition of the query Q, the update device 100 performs scanning from the initial state N0 which is the scanning position to the start state N1 in accordance with "[" in the second buffer b2, and performs scanning from the start state N1 to the initial state N0 in accordance with "2" in the second buffer b2.

Figure 12:
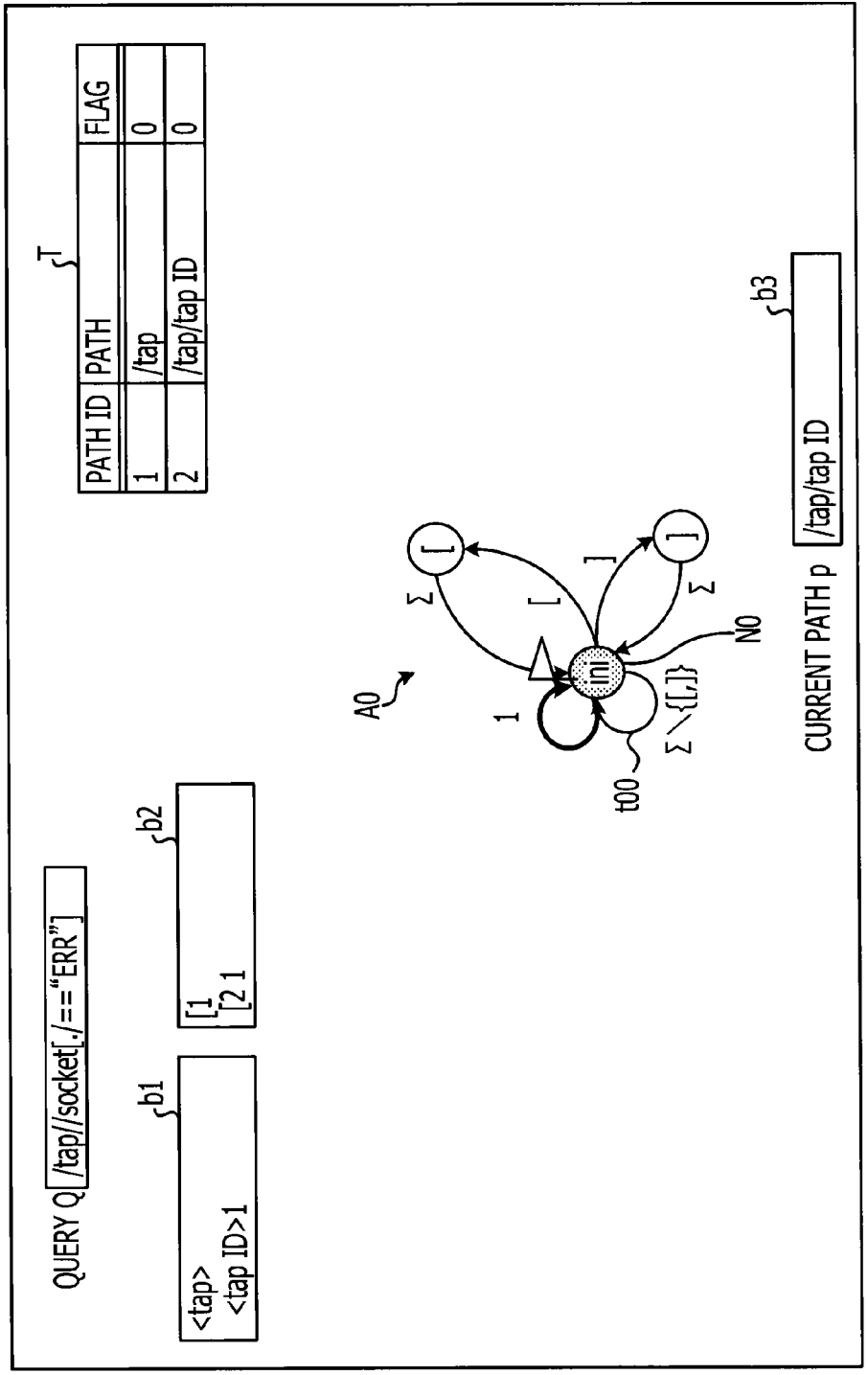
FIG. 12 is a diagram illustrating an example of operation (IV) of the automaton.

FIG. 12 is a diagram illustrating an example of operation (IV) of the automaton A. FIG. 12 illustrates processing that is performed when the character "1" of the input stream S is received from the state of FIG. 11. When the character "1" of the input stream S is written into the first buffer b1, the update device 100 reads the character "1" and writes "1" into the second buffer b2 without performing conversion. Moreover, when a character is received, registration to the path ID control table T is not performed. The update device 100 performs scanning from the initial state N0 which is the scanning position to the initial state N0 in accordance with "1" in the second buffer b2.

Figure 13:
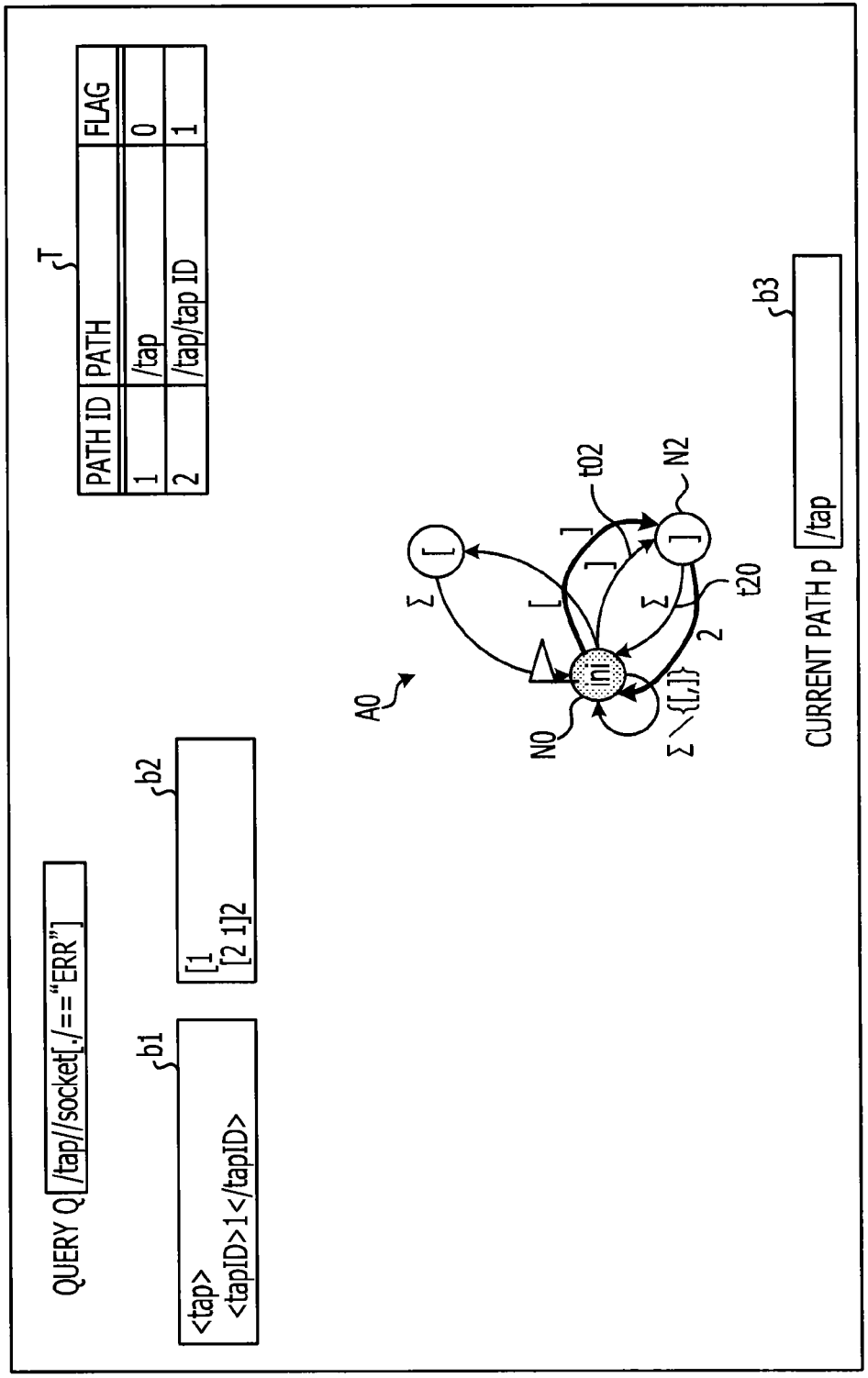
FIG. 13 is a diagram illustrating an example of operation (V) of the automaton.

FIG. 13 is a diagram illustrating an example of operation (V) of the automaton A. FIG. 13 illustrates processing that is performed when the end tag </tap ID> of the input stream S is received from the state of FIG. 12. When the end tag </tap ID> of the input stream S is written into the first buffer b1, the update device 100 reads </tap ID>, converts </tap ID> into "]2", and writes "]2" into the second buffer b2. Moreover, since the end tag </tap ID> has been received, the update device 100 sets the flag of the path p2 with the in-tag character string "tap ID" of the end tag </tap ID> at the end thereof at "1" in the path ID control table T.

When the flag is set at "1", the update device 100 determines whether or not the path matched state is present in the automaton A. Since the path matched state is not present at this point, the update device 100 performs scanning from the initial state N0 which is the scanning position to the end state N2 in accordance with "]" of "]2" in the second buffer b2, and performs scanning from the end state N2 to the initial state N0 in accordance with "2" of "]2" in the second buffer b2. Then, the update device 100 deletes "/" and the in-tag character string "tap ID" of the end tag </tap ID> from the path p2: "/tap/tap ID" in the third buffer b3 and returns the path to the path p1: "/tap".

Figure 14:
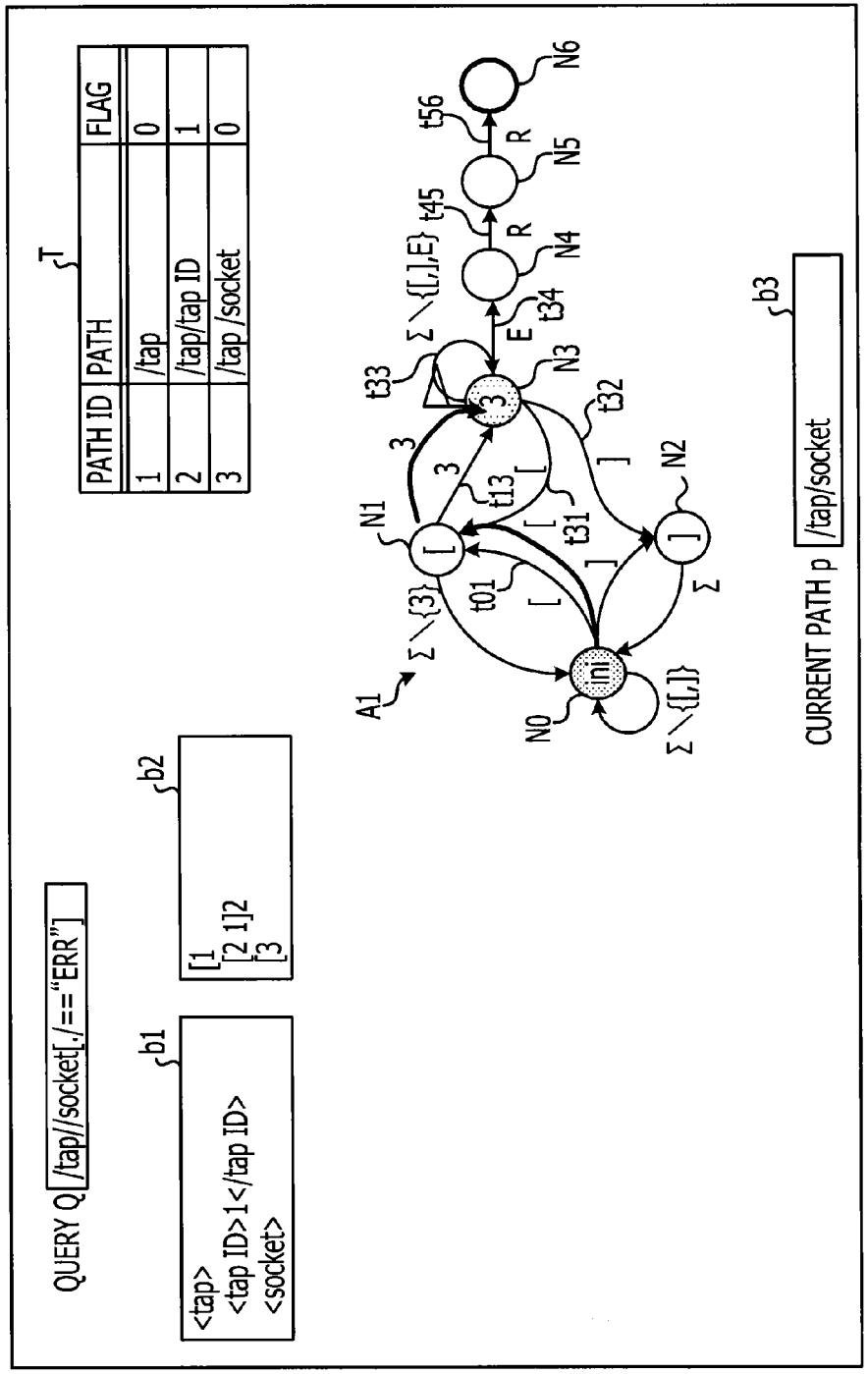
FIG. 14 is a diagram illustrating an example of operation (VI) of the automaton.

FIG. 14 is a diagram illustrating an example of operation (VI) of the automaton A. FIG. 14 illustrates processing that is performed when the start tag <socket> of the input stream S is received from the state of FIG. 13. When the start tag <socket> of the input stream S is written into the first buffer b1, the update device 100 reads <socket>, converts <socket> into "[3", and writes "[3" into the second buffer b2. Moreover, since the start tag <socket> has been received, the update device 100 writes "/" and the in-tag character string "socket" to the end of "/tap" in the third buffer b3. Then, the update device 100 registers a record indicating that a path ID is 3, a path in the third buffer b3 is "/tap/socket", and a flag is 0 in the path ID control table T.

Here, the path p3 in the third buffer b3 meets the condition of the query Q. Therefore, the update device 100 performs first updating of the automaton A. Specifically, the update device 100 first generates a new state. The new state is a state indicating a path ID: 3. Since this state is a state identifying the path p3 matched with the query Q, this state is referred to as a path matched state. Moreover, since "[3" has been written into the second buffer b2, the path matched state N3 is a transition destination state from the start state N1. Therefore, when the symbols "Σ\{3}" of the symbol Σ except for a path ID: 3 cause a transition to take place, the transition destination of the start state N1 is the initial state N0. On the other hand, when a path ID: 3 causes a transition to take place, the transition destination of the start state N1 is the path matched state N3.

Moreover, when the path matched state N3 is generated, the update device 100 generates transition destination states to which a transition sequentially takes place from the path matched state N3 by the characters forming the keyword of the query Q. Of the transition destination states to which a transition takes place by the characters forming the keyword, the transition destination state to which a transition takes place by the character other than the last character is the keyword matching partially-completed state, and the transition destination state to which a transition takes place by the last character is the keyword matching completed state. In this example, the transition destination states to which a transition takes place by the leading character "E" and the second character "R" are keyword matching partially-completed states N4 and N5, and the transition destination state to which a transition takes place by the last character "R" is a keyword matching completed state N6.

Moreover, the update device 100 generates a transition from the path matched state N3 to the start state N1 and a transition from the path matched state N3 to the end state N2. Furthermore, the update device 100 also generates a transition which is a loop of the path matched state N3 itself. This transition is symbols "Σ\{[,],E}" which are symbols of all the symbols denoted by Σ except for the start tag symbol "[", the end tag symbol "]", and the leading character "E" of the keyword. This is the end of the first updating of the automaton A. Here, the node structure N of each state after the first updating of the automaton A will be described.

Figure 15:
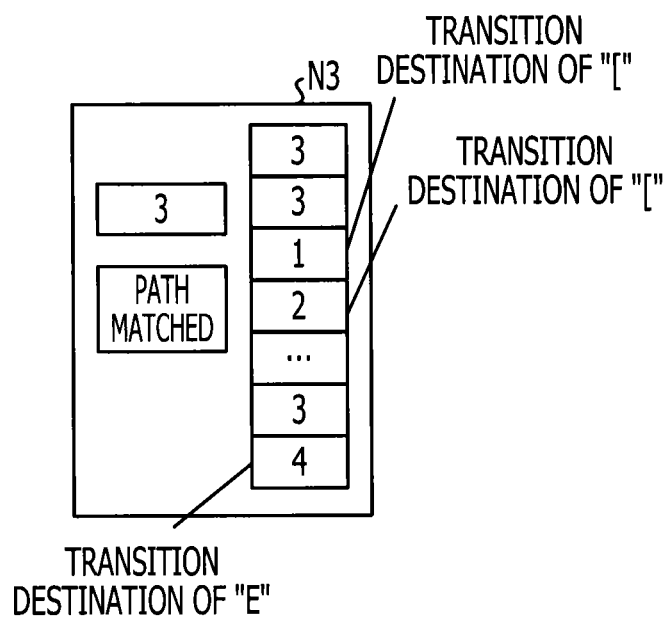
FIG. 15 is a diagram illustrating an example of the node structure of a path matched state.

FIG. 15 is a diagram illustrating an example of the node structure N of the path matched state N3. In FIG. 15, since 0 to 2 have already been assigned to the state IDs, the state ID of the path matched state N3 is "3" which has not been assigned yet. Moreover, since the state is the path matched state N3, the type of state is "path matched". Furthermore, since a transition to the start state N1 takes place when "[" appears in the path matched state N3, the state ID: 1 of the start state N1 is stored in the area of the list L for the symbol "[". Likewise, since a transition to the end state N2 takes place when "]" appears in the path matched state N3, the state ID: 2 of the end state N2 is stored in the area of the list L for the symbol "]".

Likewise, since a transition to the keyword matching partially-completed state to which a state ID: 4 is assigned takes place when the character "E" appears in the path matched state N3, the state ID: 4 of the keyword matching partially-completed state is stored in the area of the list L for the symbol "4". Moreover, for each of "Σ\{[,],4}" which are symbols of all the symbols denoted by Σ except for "[", "]", and "4", since the path matched state N3 loops, the state ID: 3 of the path matched state N3 is stored in the areas for the symbols "Σ\{[,],4}".

FIGS. 16A to 16C are diagrams describing examples of the node structures N of the keyword matching partially-completed state and the keyword matching completed state. In FIGS. 16A to 16C, FIG. 16A illustrates a keyword matching partially-completed state N4 to which a transition takes place by the leading character "E", FIG. 16B illustrates a keyword matching partially-completed state N5 to which a transition takes place by the second character "R", and FIG. 16C illustrates a keyword matching completed state N6 to which a transition takes place by the last character "R".

In FIG. 16A, a state ID is "4". Moreover, since the state is the keyword matching partially-completed state, the type of state is "keyword matching partially-completed". Furthermore, since a transition to the next keyword matching partially-completed state N5 takes place when the character "R" appears in the keyword matching partially-completed state N4, the state ID: 5 of the next keyword matching partially-completed state N5 is stored in the area of the list L for the symbol "R". Likewise, since a transition to the start state N1 takes place when "[" appears, the state ID: 1 of the start state N1 is stored in the area of the list L for the symbol "[". Moreover, since a transition to the end state N2 takes place when "]" appears, the state ID: 2 of the end state N2 is stored in the area of the list L for the symbol "]". Furthermore, for each of "Σ\{[,],5}" which are symbols of all the symbols denoted by Σ except for "[", "]", and "5", since a transition to the path matched state N3 takes place, the state ID: 3 of the path matched state N3 is stored in the areas for the symbols "Σ\{[,],5}".

In FIG. 16B, a state ID is "5". Moreover, since the state is the keyword matching partially-completed state, the type of state is "keyword matching partially-completed". Furthermore, since a transition to the keyword matching completed state N6 takes place when the character "R" appears in the keyword matching partially-completed state N5, the state ID: 6 of the keyword matching completed state N6 is stored in the area of the list L for the symbol "R". Likewise, since a transition to the start state N1 takes place when "[" appears, the state ID: 1 of the start state N1 is stored in the area of the list L for the symbol "[". Moreover, since a transition to the end state N2 takes place when "]" appears, the state ID: 2 of the end state N2 is stored in the area of the list L for the symbol "]". Furthermore, for each of "Σ\{[,], 5}" which are symbols of all the symbols denoted by Σ except for "[", "]", and "5", since a transition to the path matched state N3 takes place, the state ID: 3 of the path matched state N3 is stored in the areas for the symbols "Σ\{[,],5}".

In FIG. 16C, a state ID is "6". Moreover, since the state is the keyword matching completed state, the type of state is "keyword matching completed". Furthermore, since a transition to the start state N1 takes place when "[" appears in the keyword matching completed state N6, the state ID: 1 of the start state N1 is stored in the area of the list L for the symbol "[". In addition, since a transition to the end state N2 takes place when "]" appears, the state ID: 2 of the end state N2 is stored in the area of the list L for the symbol "[". Moreover, for each of "Σ\{[,]}" which are symbols of all the symbols denoted by Σ except for "[" and "]", since a transition to the path matched state N3 takes place, the state ID: 3 of the path matched state N3 is stored in the areas for the symbols "Σ\{[,]}".

Figure 17:
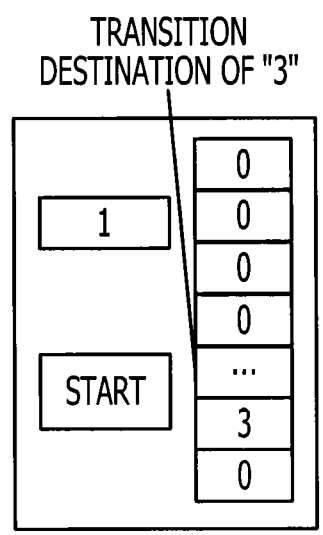
FIG. 17 is a diagram illustrating an example of an update of a start state.

FIG. 17 is a diagram illustrating an example of an update of the start state N1. The state ID: 3 of the path matched state N3 is stored in the area for the symbol "3" of the list L of the start state N1. As a result, when "3" appears when the scanning position is the start state N1, a transition to the path matched state N3 takes place, and, when a symbol other than "3" appears, a transition to the initial state N0 takes place. Next, back in FIG. 14, the start of scanning by the updated automaton A will be described.

In FIG. 14, the update device 100 starts scanning by the updated automaton A. The update device 100 performs scanning from the initial state N0 which is the scanning position to the start state N1 in accordance with "[" of "]3" in the second buffer b2, and performs scanning from the start state N1 to the path matched state N3 in accordance with "3" in the second buffer b2. The scanning position is the path matched state N3.

Figure 18:
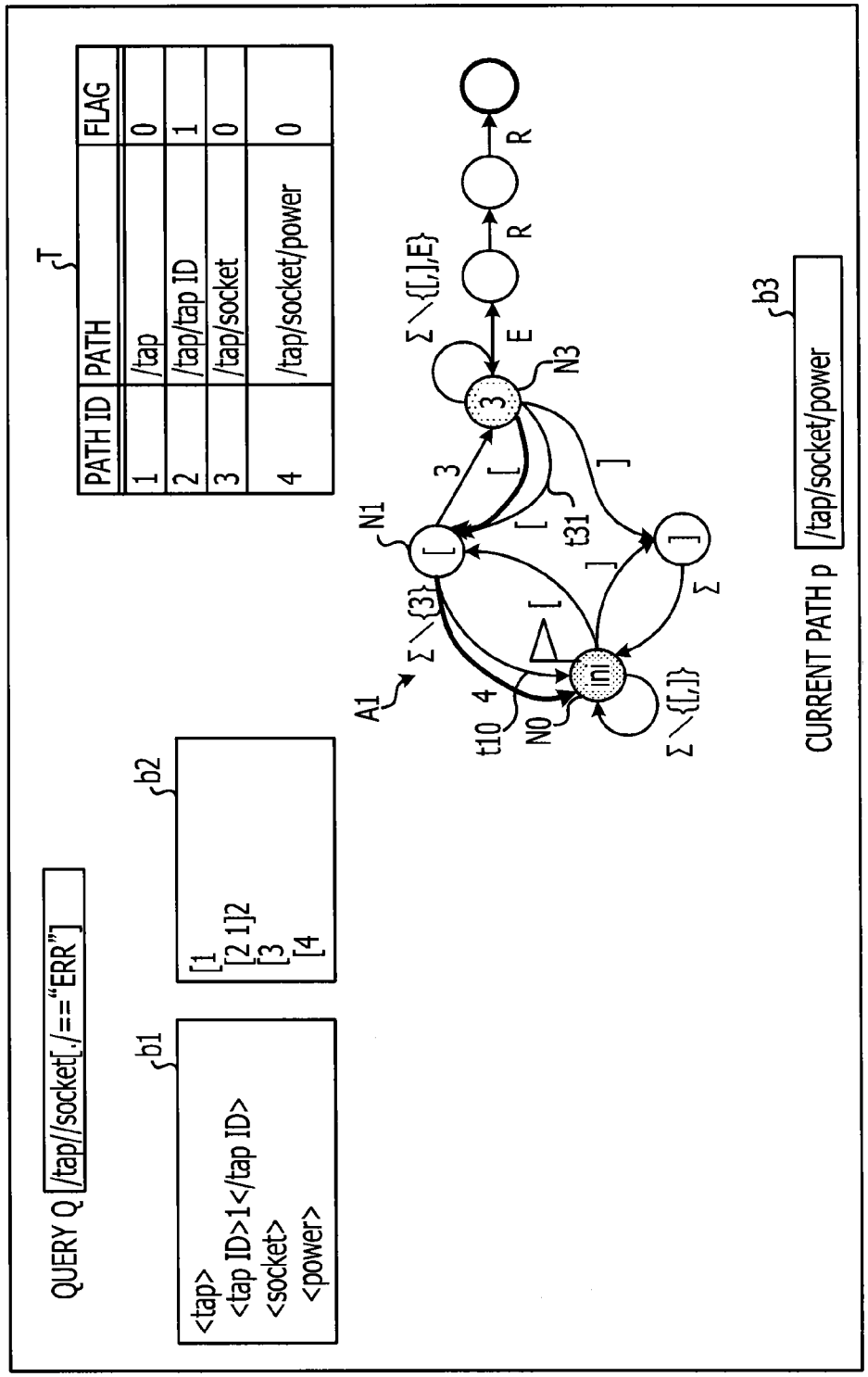
FIG. 18 is a diagram illustrating an example of operation (VII) of the automaton.

FIG. 18 is a diagram illustrating an example of operation (VII) of the automaton A. FIG. 18 illustrates processing that is performed when the start tag <power> of the input stream S is received from the state of FIG. 14. When the start tag <power> of the input stream S is written into the first buffer b1, the update device 100 reads <power>, converts <power> into "[4", and writes "[4" into the second buffer b2. Moreover, since the start tag <power> has been received, the update device 100 writes "/" and the in-tag character string "power" to the end of "/tap/socket" in the third buffer b3. Then, the update device 100 registers a record indicating that a path ID is 4, a path in the third buffer b3 is "/tap/socket/power", and a flag is 0 in the path ID control table T. Moreover, since the path p4 in the third buffer b3 does not meet the condition of the query Q, the update device 100 performs scanning from the path matched state N3 which is the scanning position to the start state N1 in accordance with "[" of "[4" in the second buffer b2, and performs scanning from the start state N1 to the initial state N0 in accordance with "4" in the second buffer b2.

Figure 19:
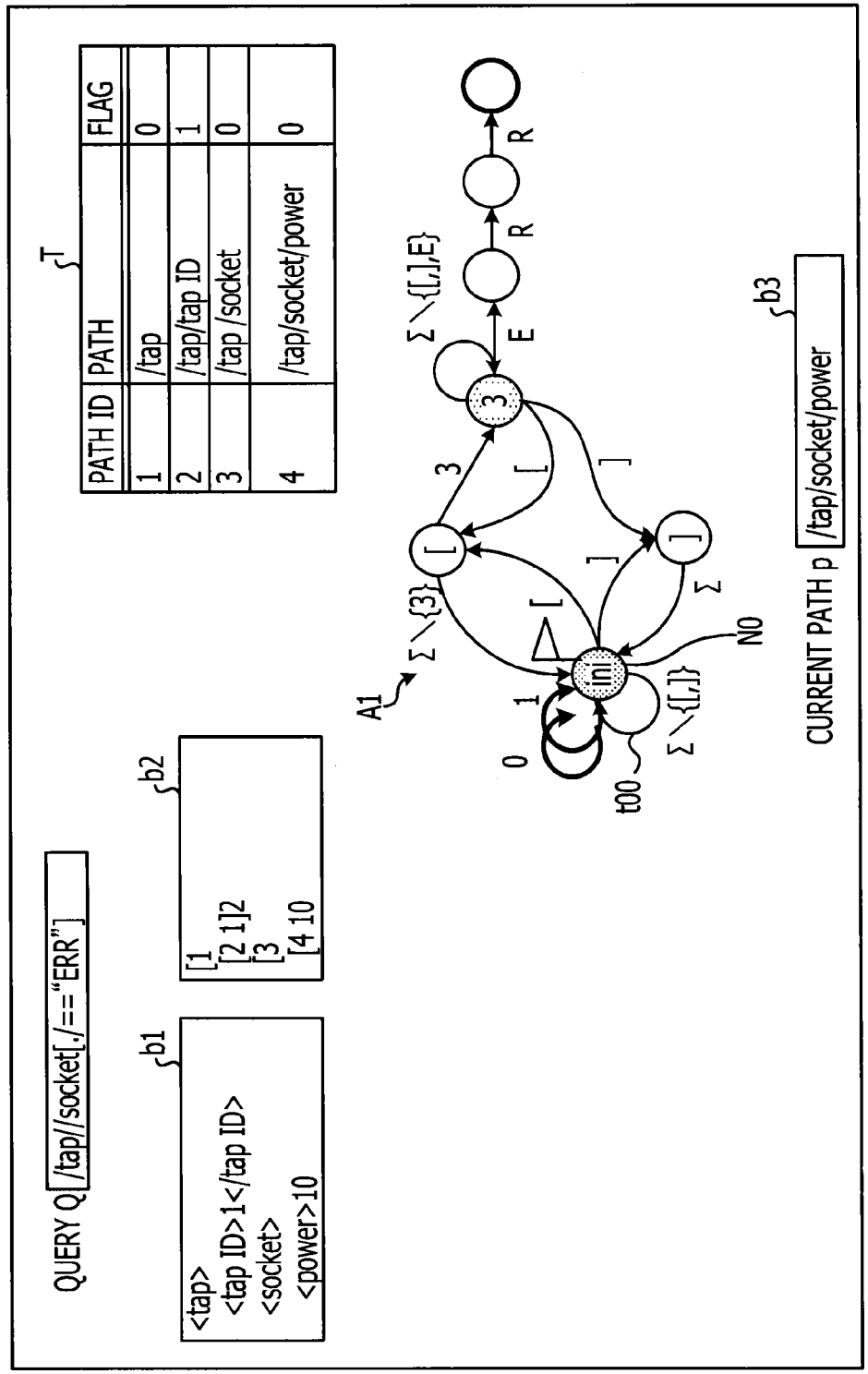
FIG. 19 is a diagram illustrating an example of operation (VIII) of the automaton.

FIG. 19 is a diagram illustrating an example of operation (VIII) of the automaton A. FIG. 19 illustrates processing that is performed when the character string "10" of the input stream S is received from the state of FIG. 18. When the character string "10" of the input stream S is written into the first buffer b1, the update device 100 reads the character string "10" and writes the character string "10" into the second buffer b2 without performing conversion. Moreover, when the character string "10" is received, registration to the path ID control table T is not performed. Furthermore, the update device 100 performs scanning from the initial state N0 which is the scanning position to the initial state N0 in accordance with "1" in the second buffer b2, and performs scanning from the initial state N0 which is the scanning position to the initial state N0 in accordance with "0" in the second buffer b2.

Figure 20:
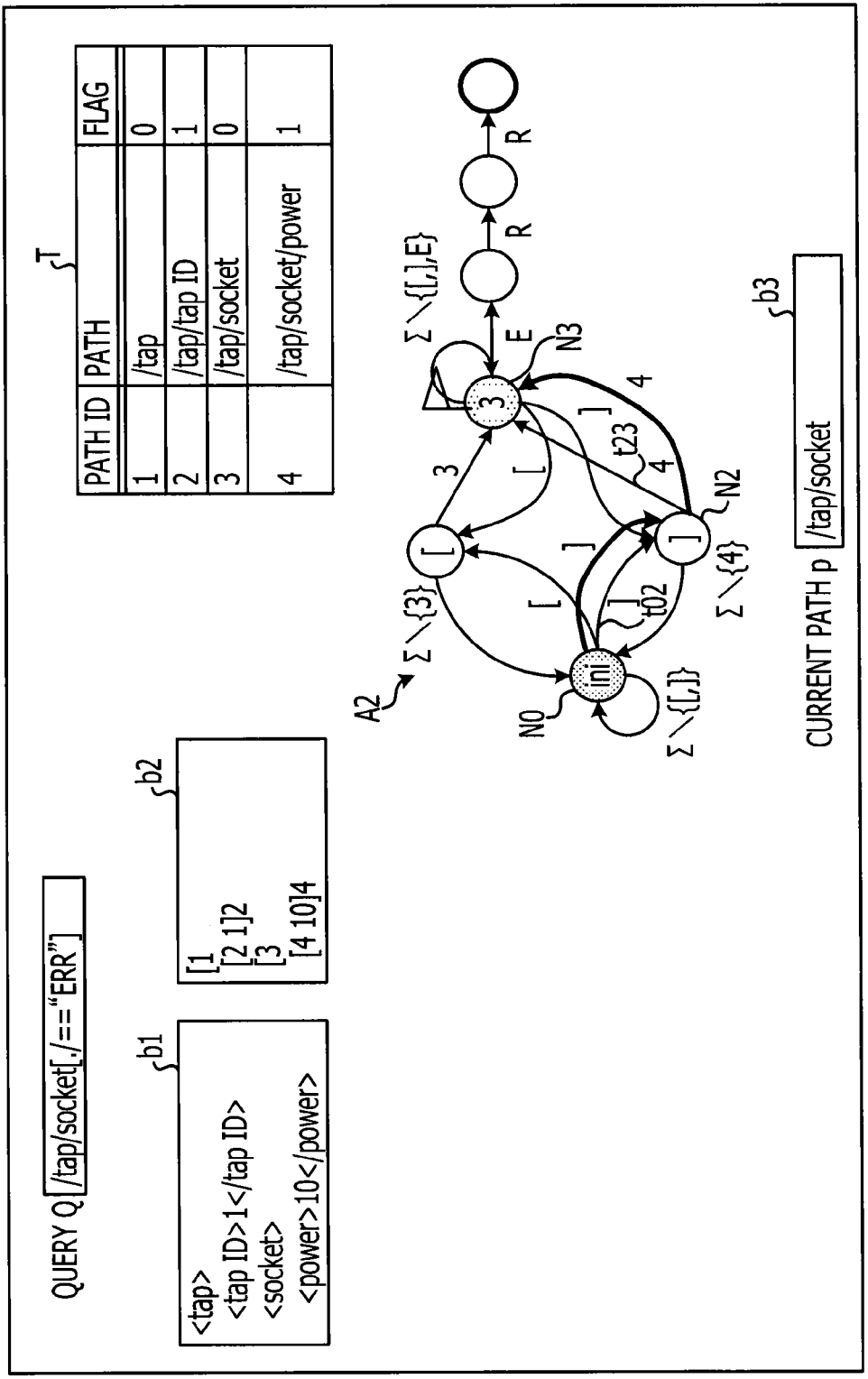
FIG. 20 is a diagram illustrating an example of operation (IX) of the automaton.

FIG. 20 is a diagram illustrating an example of operation (IX) of the automaton A. FIG. 20 illustrates processing that is performed when the end tag </power> of the input stream S is received from the state of FIG. 19. When the end tag </power> of the input stream S is written into the first buffer b1, the update device 100 reads </power>, converts </power> into "]4", and writes "]4" into the second buffer b2. Moreover, since the end tag </power> has been received, the update device 100 sets the flag of the path p4 with the in-tag character string "power" of the end tag </power> at the end thereof at "1" in the path ID control table T.

When the flag is set at "1", the update device 100 sets a master path of the current path p4. The master path is a path in the hierarchy next above the hierarchy of the current path. That is, the master path is generated by deletion of the end of the current path. In the case of FIG. 20, a master path p3 is obtained by deletion of "power" at the end of the current path p4. The update device 100 determines whether or not a path matched state corresponding to the master path p3 is present in the automaton A. In this case, the path matched state N3 corresponding to the master path p3 is present.

Since the master path p3 corresponding to the path matched state N3 meets the condition of the query Q, the update device 100 performs second updating of the automaton A. Specifically, the update device 100 generates a transition from the end state N2 to the path matched state N3. This transition is the symbol "4" converted from the in-tag character string "power". Moreover, the update device 100 changes a transition from the end state N2 to the initial state N0 to "Σ\{4}" which are symbols of all the symbols denoted by Σ except for the symbol "4".

Then, the update device 100 performs scanning from the initial state N0 which is the scanning position to the end state N2 in accordance with "]" of "]4" in the second buffer b2, and performs scanning from the end state N2 to the path matched state N3 in accordance with "4" of "]4" in the second buffer b2. Then, the update device 100 returns the path p4: "/tap/socket/power" in the third buffer b3 to the path p3: "/tap/socket" by deleting "/" and the in-tag character string "power" of the end tag </power> from the path p4: "/tap/socket/power". That is, since a transition from the end state N2 to the path matched state N3 is generated in FIG. 20, the update device 100 is capable of performing scanning that is performed until the master path meets the condition of the query Q without waiting for the generation of a transition from the end state N2 to the path matched state N3. This makes it possible to suppress a delay in processing.

Figure 21:
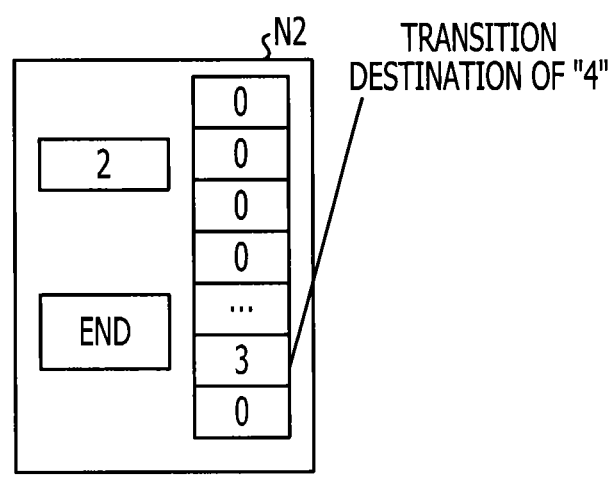
FIG. 21 is a diagram illustrating an example of an update of an end state.

FIG. 21 is a diagram illustrating an example of an update of the end state N2. The state ID: 3 of the path matched state N3 is stored in the area of the list L of the end state N2 for the symbol "4". As a result, when the scanning position is the end state N2, if "4" appears, a transition to the path matched state N3 takes place, and, if a symbol other than "4" appears, a transition to the initial state N0 takes place.

Figure 22:
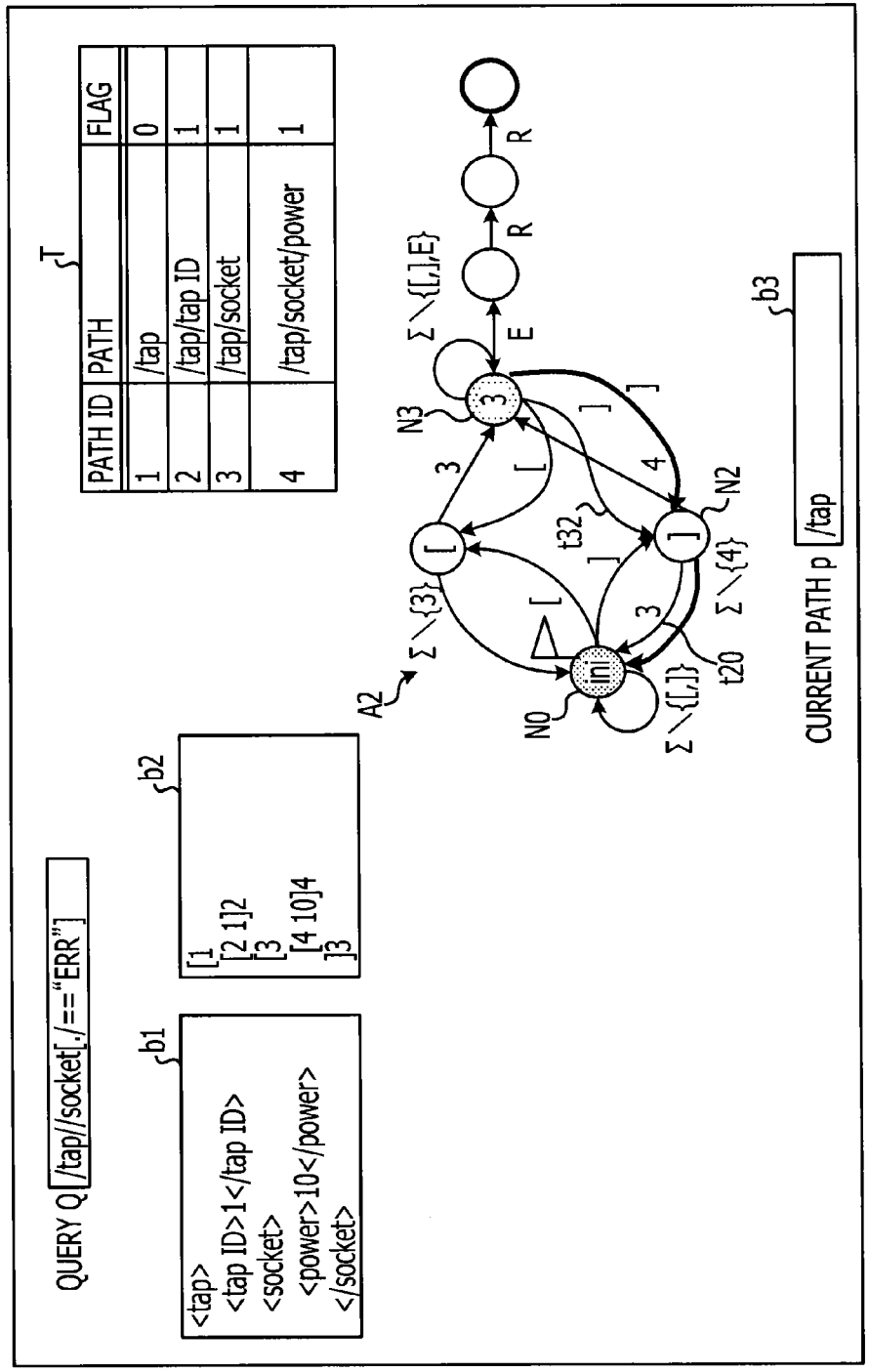
FIG. 22 is a diagram illustrating an example of operation (X) of the automaton.

FIG. 22 is a diagram illustrating an example of operation (X) of the automaton A. FIG. 22 illustrates processing when the end tag </socket> of the input stream S is received from the state of FIG. 20. When the end tag </socket> of the input stream S is written into the first buffer b1, the update device 100 reads </socket>, converts </socket> into "]3", and writes "]3" into the second buffer b2. Moreover, since the end tag </socket> has been received, the update device 100 sets the flag of the path p3 with the in-tag character string "socket" of the end tag </socket> at the end thereof at "1" in the path ID control table T.

When the flag is set at "1", the update device 100 sets a master path of the current path p3. In the case of FIG. 22, a master path p1 is obtained by deletion of "socket" at the end of the current path p3. The update device 100 determines whether or not a path matched state corresponding to the master path p1 is present in the automaton A. In this case, a path matched state corresponding to the master path p1 is not present. That is, for the master path p1, it is impossible to perform the second updating of the automaton A.

Therefore, the update device 100 performs scanning from the path matched state N3 which is the scanning position to the end state N2 in accordance with "]" of "]3" in the second buffer b2, and performs scanning from the end state N2 to the initial state N0 in accordance with "3" of "]3" in the second buffer b2. Then, the update device 100 returns the path p2: "/tap/tap ID" in the third buffer b3 to the path p1: "/tap" by deleting "/" and the in-tag character string "tap ID" of the end tag </tap ID> from the path p2: "/tap/tap ID".

Figure 23:
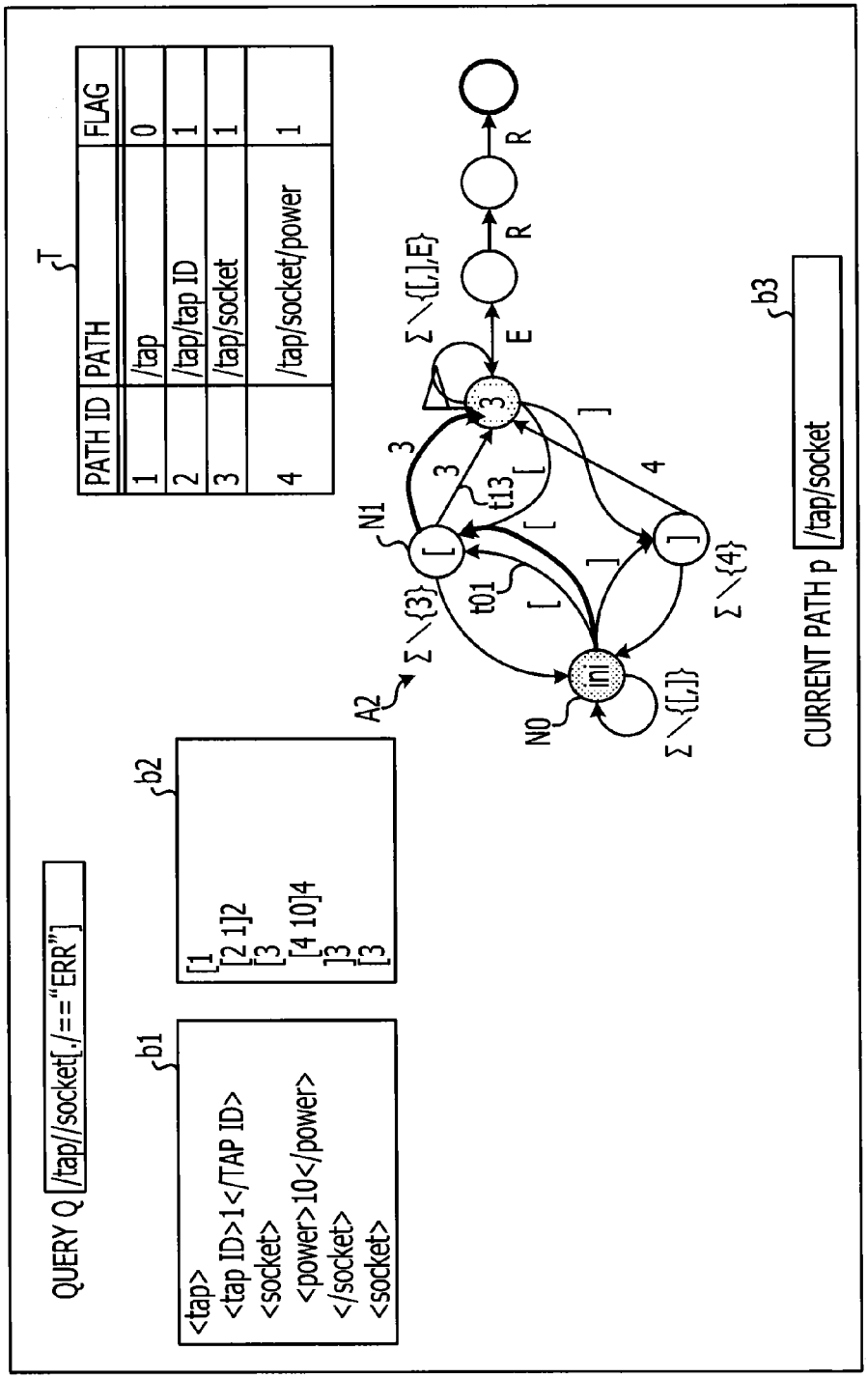
FIG. 23 is a diagram illustrating an example of operation (XI) of the automaton.

FIG. 23 is a diagram illustrating an example of operation (XI) of the automaton A. FIG. 23 illustrates processing that is performed when the start tag <socket> of the input stream S is received from the state of FIG. 22. When the start tag <socket> of the input stream S is written into the first buffer b1, the update device 100 reads <socket>, converts <socket> into "[3", and writes "[3" into the second buffer b2. Moreover, since the start tag <socket> has been received, the update device 100 writes "/" and the in-tag character string "socket" to the end of "/tap" in the third buffer b3.

Since the update device 100 has already registered the path p3 which is the path "/tap/socket" in the third buffer b3 in the path ID control table T, registration to the path ID control table T is not performed. Then, the update device 100 performs scanning from the initial state N0 which is the scanning position to the start state N1 in accordance with "[" of "[3" in the second buffer b2, and performs scanning from the start state N1 to the path matched state N3 in accordance with "3" of "[3" in the second buffer b2.

Figure 24:
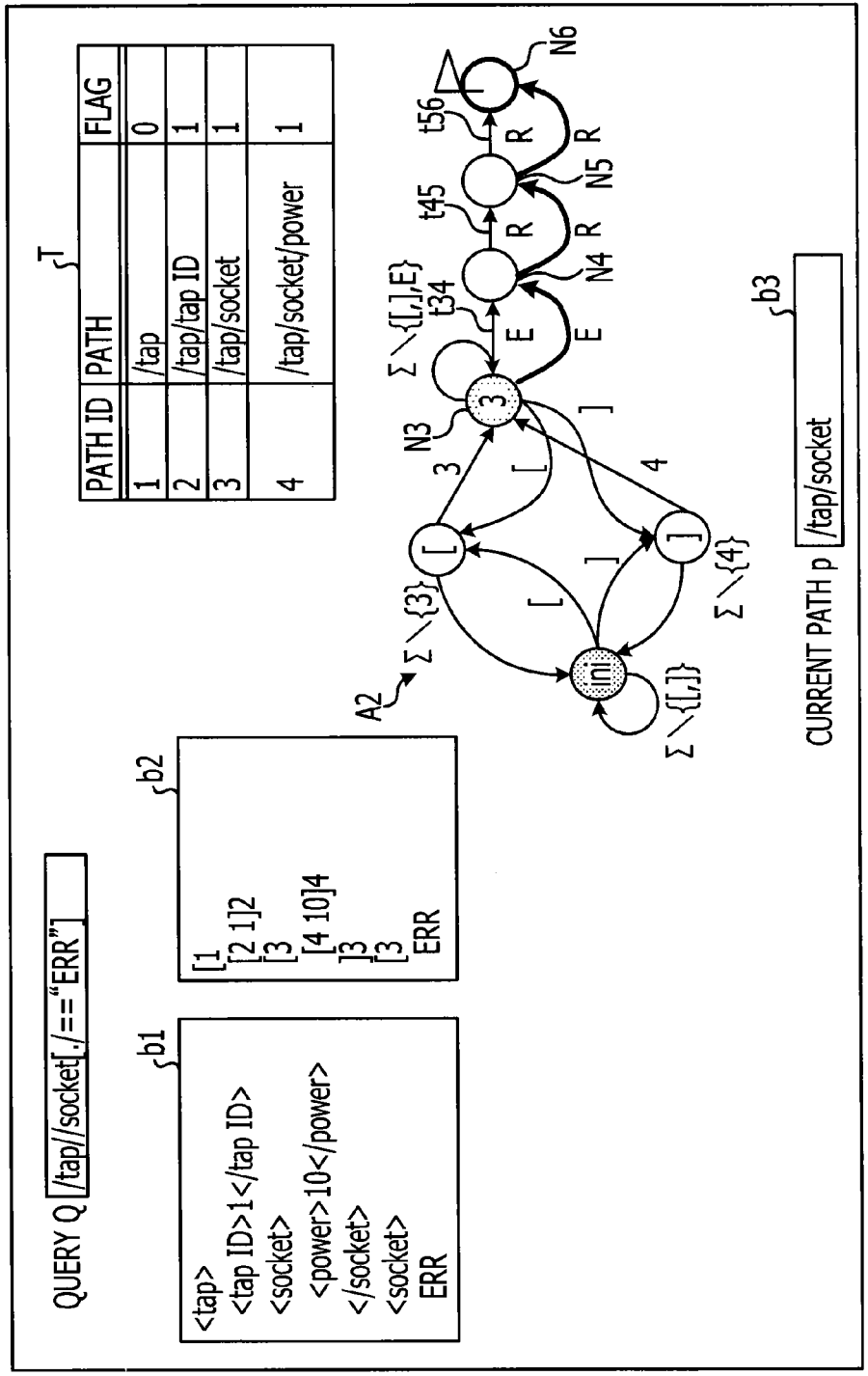
FIG. 24 is a diagram illustrating an example of operation (XII) of the automaton.

FIG. 24 is a diagram illustrating an example of operation (XII) of the automaton A. FIG. 24 illustrates processing that is performed when the character string "ERR" of the input stream S is received from the state of FIG. 23. When the character string "ERR" of the input stream S is written into the first buffer b1, the update device 100 reads the character "ERR" and writes the character "ERR" into the second buffer b2 without performing conversion. Moreover, when a character string is received, registration to the path ID control table T is not performed.

Then, the update device 100 performs scanning from the path matched state N3 which is the scanning position to the keyword matching partially-completed state N4 in accordance with the leading character "E" of the character string "ERR" in the second buffer b2. Next, the update device 100 performs scanning from the keyword matching partially-completed state N4 which is the scanning position to the next keyword matching partially-completed state N5 in accordance with the second character "R" of the character string "ERR", and performs scanning to the keyword matching completed state N6 in accordance with the last character "R" of the character string "ERR". Since a transition to the keyword matching completed state N6 has taken place, the update device 100 outputs the keyword "ERR" of the query Q.

Figure 25:
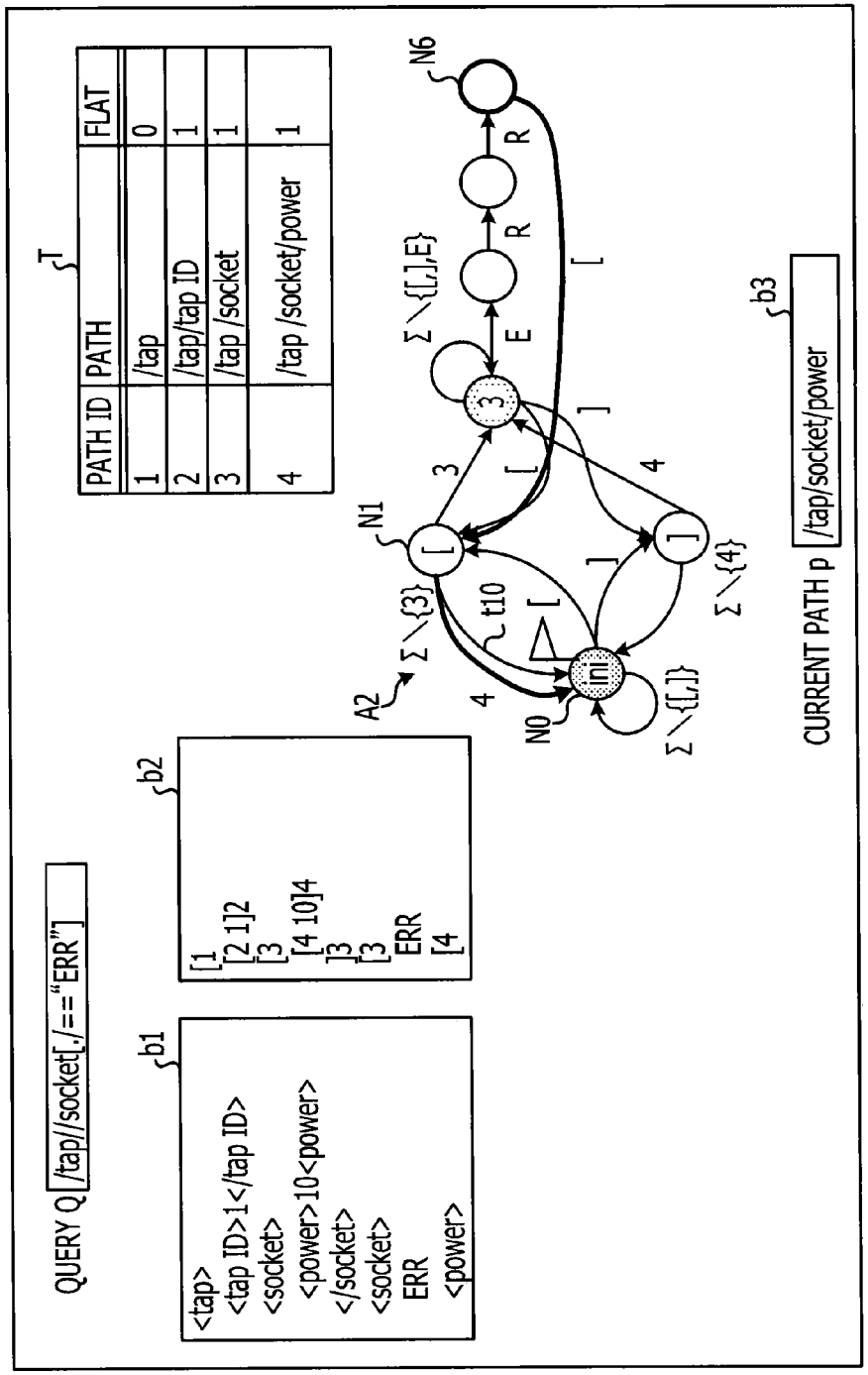
FIG. 25 is a diagram illustrating an example of operation (XIII) of the automaton.

FIG. 25 is a diagram illustrating an example of operation (XIII) of the automaton A. FIG. 25 illustrates processing that is performed when the start tag <power> of the input stream S is received from the state of FIG. 24. When the start tag <power> of the input stream S is written into the first buffer b1, the update device 100 reads <power>, converts <power> into "[4", and writes "[4" into the second buffer b2. Moreover, since the start tag <power> has been received, the update device 100 writes "/" and the in-tag character string "power" to the end of "/tap/socket" in the third buffer b3.

Then, since the update device 100 has already registered the path p4 which is the path "/tap/socket/power" in the third buffer b3 in the path ID control table T, registration to the path ID control table T is not performed. Moreover, when the scanning position is the keyword matching completed state N6, even when any symbol appears, since scanning is completed, a transition will be performed unsuccessfully. In the case of the start tag symbol "[", the scanning position transitions to the start state N1, in the case of the end tag symbol "]", the scanning position transitions to the end state N2, and, in the case of the other symbols, the scanning position transitions to the path matched state N3. In the case of FIG. 25, the update device 100 performs scanning from the keyword matching completed state N6 to the start state N1 in accordance with "[" of "[4" in the second buffer b2, and performs scanning from the start state N1 to the initial state N0 in accordance with the symbol "4" of "[4". Thereafter, the automaton A is scanned in accordance with the operation described above.

Hardware Configuration Example of the Update Device 100

Figure 26:
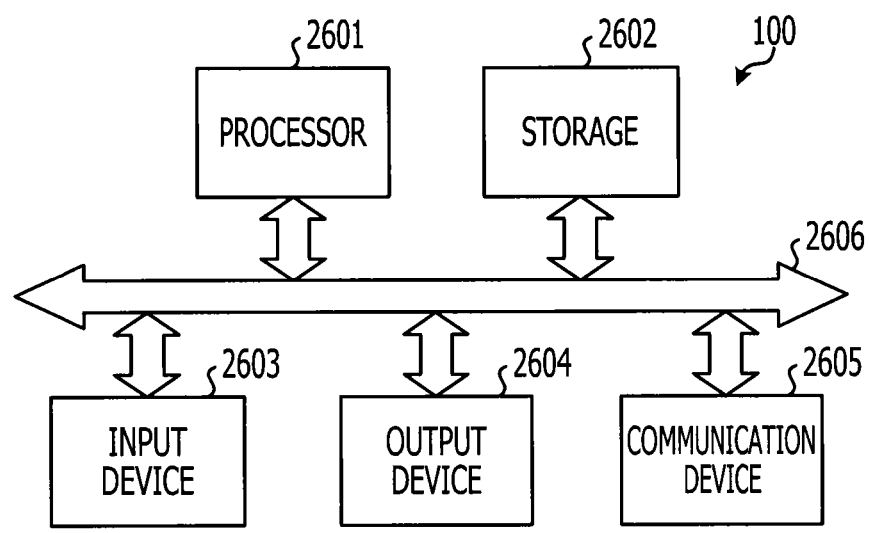
FIG. 26 is a block diagram of a hardware configuration example of an update device.

FIG. 26 is a block diagram of a hardware configuration example of the update device 100. In FIG. 26, the update device 100 is a computer formed of a processor 2601, a storage 2602, an input device 2603, an output device 2604, and a communication device 2605 which are connected to a bus 2606.

The processor 2601 performs overall control of the computer. Moreover, the processor 2601 executes various kinds of programs (an operating system (OS) and the update program of this embodiment) stored in the storage 2602 to read data in the storage 2602 and write data which is the execution result into the storage 2602.

The storage 2602 is formed as read-only memory (ROM), random-access memory (RAM), flash memory, a magnetic disk drive, or the like. The storage 2602 functions as a work area of the processor 2601 and stores various kinds of programs (an OS and the update program of this embodiment) and various kinds of data (including data acquired by the execution of each program).

The input device 2603 is an interface such as a keyboard, a mouse, a touch panel, or the like that performs the inputting of various kinds of data by user operation. The output device 2604 is an interface that outputs data in accordance with an instruction given by the processor 2601. Examples of the output device 2604 include a display and a printer. The communication device 2605 is an interface that receives data from the outside and transmits data to the outside via the network 101.

Functional Configuration Example of the Update Device 100

Figure 27:
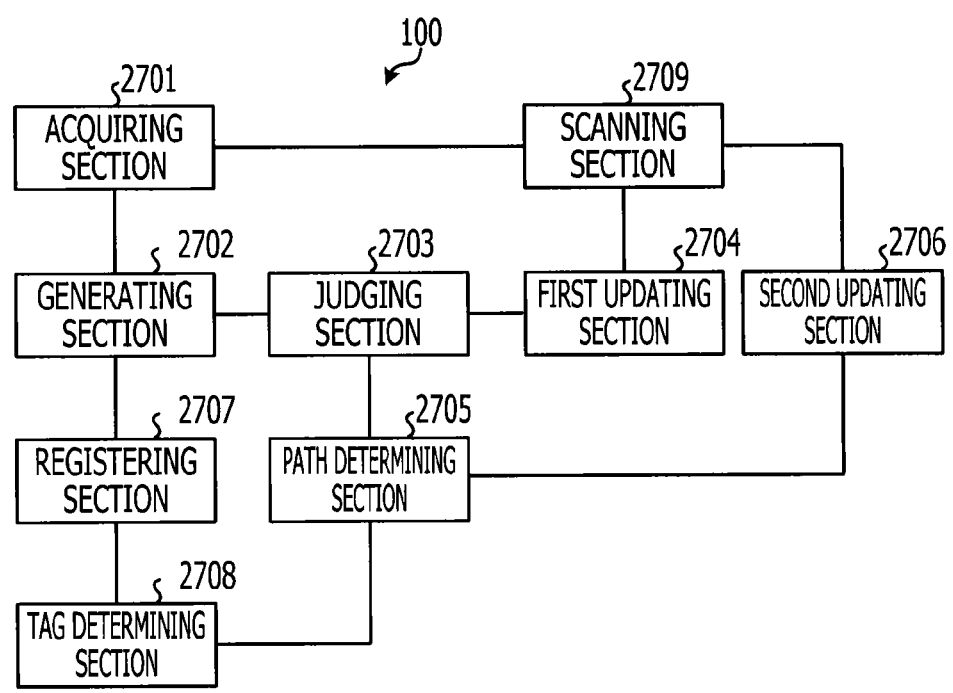
FIG. 27 is a block diagram of a functional configuration example of the update device.

FIG. 27 is a block diagram of a functional configuration example of the update device 100. The update device 100 includes an acquiring section 2701, a generating section 2702, a judging section 2703, a first updating section 2704, a path determining section 2705, a second updating section 2706, a registering section 2707, a tag determining section 2708, and a scanning section 2709. Specifically, the acquiring section 2701, the generating section 2702, the judging section 2703, the first updating section 2704, the path determining section 2705, the second updating section 2706, the registering section 2707, the tag determining section 2708, and the scanning section 2709 implement the functions thereof by making the processor 2601 execute the program stored in the storage 2602 illustrated in FIG. 26.

The acquiring section 2701 acquires the initial automaton A0. Specifically, for example, when the initial automaton A0 is not constructed, the acquiring section 2701 acquires the initial automaton A0 by constructing the initial automaton A0 as illustrated in FIGS. 6A and 6B. The acquiring section 2701 stores the initial automaton A0 thus constructed in the storage 2602. Moreover, when the initial automaton A0 is already constructed, since the initial automaton A0 is stored in the storage 2602, the acquiring section 2701 acquires the initial automaton A0 by reading the initial automaton A0 from the storage 2602.

When a start tag is read from the input stream S, the generating section 2702 generates a path identifying the position of the start tag based on the hierarchy in the input stream S. When, for example, a path is not generated, the generating section 2702 generates "/tap" as a path when a start tag <tap> is read first. Here, "/" is a symbol for delimiting the hierarchy. Then, when a start tag <tap ID> is read, the generating section 2702 adds an in-tag character string "tap ID" in the start tag <tap ID> to the end of the path to update the path "/tap" to a path "/tap/tap ID".

As a result, when an XML file is read as an input stream S, the update device 100 is capable of identifying which tag is in which hierarchy even without grasping a path schema of the XML file. This makes it possible to update the automaton A even when an input stream S is read in a state with no path schema.

Moreover, when an end tag is read, the generating section 2702 updates a path by deleting an in-tag character string of the end tag from the end of the path. For example, assume that an end tag </power> is read when a path is "/tap/socket/power". Then, the generating section 2702 updates the path "/tap/socket/power" to a path "/tap/socket" by deleting an in-tag character string "power" of the end tag </power> from the path "/tap/socket/power". When the end tag is read, since the path does not extend to a lower hierarchy, a target path is returned to a path next above the hierarchy.

As a result, when an XML file is read as an input stream S, the update device 100 is capable of identifying which tag is in which hierarchy even without grasping a path schema of the XML file. This makes it possible to update the automaton A even when an input stream S is read in a state with no path schema.

The judging section 2703 judges whether or not the path generated by the generating section 2702 meets a condition corresponding to a keyword in the query Q. In the query Q, a condition and a keyword that is output when the condition is met are described. The condition is a path identifying an in-tag character string of a hierarchy in which a keyword to be output may be present. As for the condition, in XPath notation, a channel located in the channel to the in-tag character string of a hierarchy in which a keyword may be present may be described in an abbreviated form as illustrated in FIG. 1. In the case of FIG. 1, the condition is "/tap//socket" and is a path from "tap" to "socket". In this example, the path p3 illustrated in FIG. 4 is a path matched with the condition "/tap//socket".

When the judging section 2703 judges that the path generated by the generating section 2702 meets the condition, the first updating section 2704 performs first updating from the initial automaton A0. As a result, as illustrated in FIG. 14, the initial automaton A0 is updated to the automaton A1. That is, of three types of automaton update processing: "generation of a new state", "change of a transition destination from the start state N1", and "change of a transition destination from the end state N2" that have been performed at a time point of reception of a new start tag, "generation of a new state" and "change of a transition destination from the start state N1" are performed. At this point, since "change of a transition destination from the end state N2" is not performed, it is possible to perform scanning of the automaton A until that update processing is performed and suppress a delay in processing.

When the end tag is read from the input stream S, the path determining section 2705 determines whether or not the path that has been judged to meet the condition is a superior path included in a path indicating a channel to the start tag. The superior path is a master path described in FIGS. 20 and 22. When the path that meets the condition is a master path, a path matched state is present in the automaton A. Therefore, second updating of the automaton A is performed. When the path that meets the condition is not a master path, second updating of the automaton A does not have to be performed.

When the path determining section 2705 determines that the path that has been judged to meet the condition is a superior path, the second updating section 2706 updates the automaton A updated by the first updating section 2704 by generating a transition from the end state to the path matched state when a character string in the start tag is scanned in the end state. That is, the second updating section 2706 performs second updating of the automaton. Of the three types of automaton update processing: "generation of a new state", "change of a transition destination from the start state N1", and "change of a transition destination from the end state N2", the update device 100 performs "change of a transition destination from the end state N2" at a time point of reception of a corresponding end tag. This makes it possible to distribute the load of automaton update processing and suppress a delay in processing.

The registering section 2707 registers a path and information indicating whether or not an end tag indicating a last in-tag character string in the path has already been read. Specifically, for example, as illustrated in FIGS. 10, 11, 14, and 18, the registering section 2707 registers a path, an ID identifying the path, and a flag in the path ID control table T. The flag is an example of the information indicating whether or not an end tag indicating a last in-tag character string has already been read. This makes it possible for the update device 100 to monitor whether or not the end tag has already been read.

The tag determining section 2708 determines whether or not an end tag indicating a last in-tag character string in the path registered by the registering section 2707 has been read from the input stream S first. When it is determined that an end tag indicating a last in-tag character string in the path registered by the registering section 2707 has been read from the input stream S first, a transition from the end state to the path matched state will be desired in scanning of the automaton A. Therefore, at this time point, second updating of the automaton A by the second updating section 2706 is performed.

Specifically, when the tag determining section 2708 determines that an end tag corresponding to a start tag in a combination has been read from the input stream S first, the path determining section 2705 determines whether or not the path that has been judged to meet the condition is a superior path. When it is determined that the path that has been judged to meet the condition is a superior path, second updating of the automaton A by the second updating section 2706 is performed. As described above, by monitoring the tag from the input stream S, it is possible to detect the timing of the second updating of the automaton A and therefore automatically start the second updating of the automaton A. This makes it possible to update the automaton A efficiently.

When a character other than a tag is read from the input stream S, the scanning section 2709 causes a transition from a state which is the current scanning position of the automaton A to a state corresponding to the character to take place in accordance with the automaton A. This makes it possible to scan the automaton A by the input stream S while updating the automaton A and reduce the processing time. Moreover, when the scanning section 2709 causes a transition to the keyword matching completed state N6 to take place, this means that a character string sandwiched between the tags in the input stream S has matched with the keyword in the query Q. In this case, the scanning section 2709 outputs the matching keyword to the output device, the communication device, or the storage of the update device 100.

When the output device 2604 is a display, the matching keyword is displayed on the display, and, when the output device 2604 is a printer, the matching keyword is printed. Moreover, when the keyword is output to the communication device 2605, the matching keyword is transmitted to an external device from the communication device 2605. Furthermore, the scanning section 2709 may store the matching keyword in the storage 2602.

Update Procedure Performed by the Update Device 100

Figure 28:
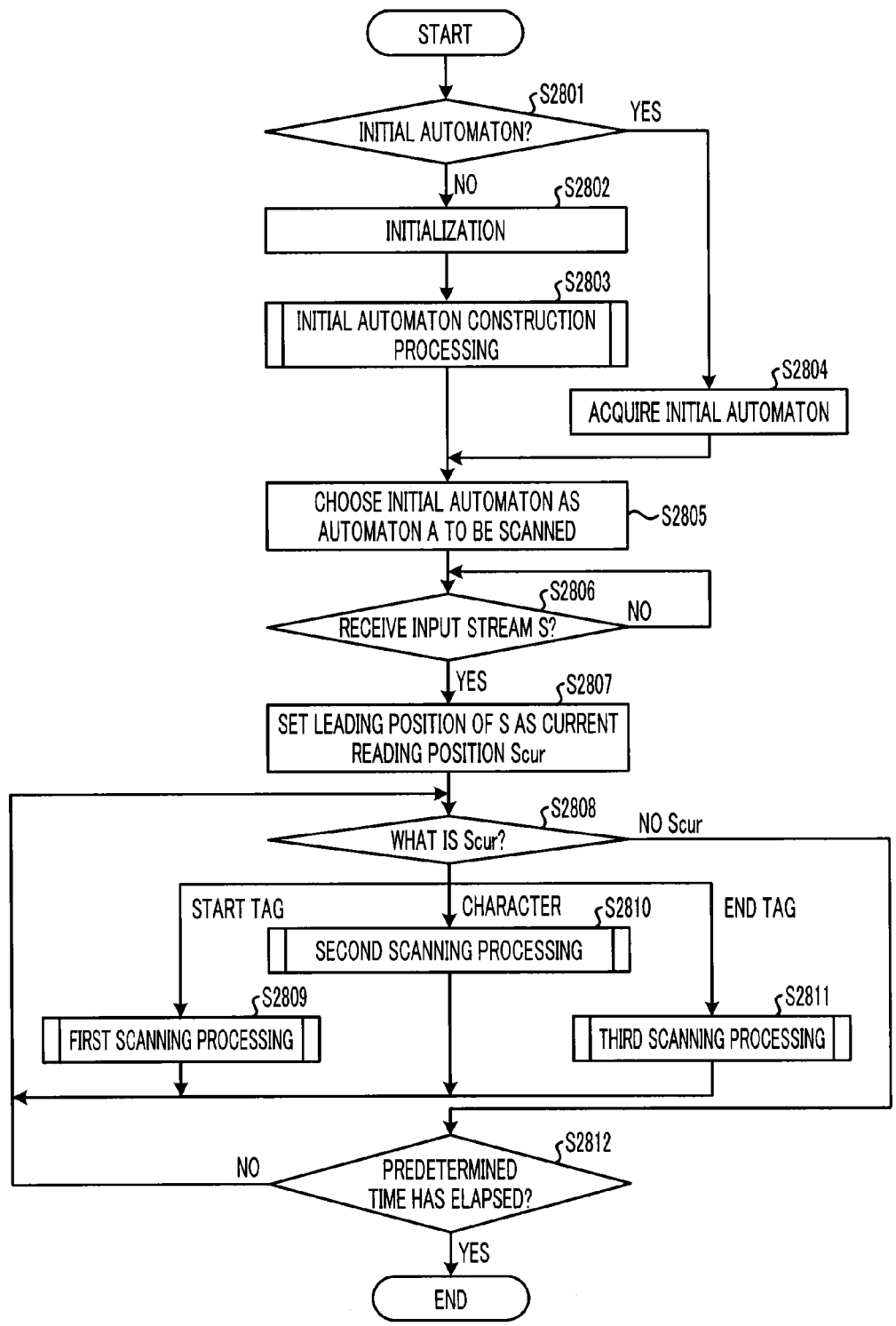
FIG. 28 is a flowchart of an example of an update procedure performed by the update device.

FIG. 28 is a flowchart of an example of an update procedure performed by the update device 100. First, the update device 100 determines whether or not there is an initial automaton A0 (step S2801). If there is no initial automaton A0 (step S2801: No), the update device 100 executes initialization (step S2802). The update device 100 executes initialization to clear out the path ID control table T in the storage.

Next, the update device 100 performs initial automaton construction processing (step S2803) and proceeds to step S2805. In the initial automaton construction processing (step S2803), an initial automaton A0 is constructed. The details of the initial automaton construction processing (step S2803) will be described later. On the other hand, if there is an initial automaton A0 (step S2801: Yes), the update device 100 acquires the initial automaton A0 from the storage (step S2804) and proceeds to the step S2805. In step S2805, the update device 100 chooses the initial automaton A0 as an automaton A to be scanned (step S2805).

Thereafter, the update device 100 waits for an input stream S (step S2806: No). If an input stream S is received (step S2806: Yes), the leading position of the input stream S is set as a current reading position Scur (step S2807). Then, the update device 100 determines whether data of the current reading position Scur is a start tag, a character, or an end tag (step S2808). If data of the current reading position Scur is a start tag (step S2808: start tag), the update device 100 performs first scanning processing (step S2809) and goes back to step S2808.

If data of the current reading position Scur is a character (step S2808: character), the update device 100 performs second scanning processing (step S2810) and goes back to step S2808. If data of the current reading position Scur is an end tag (step S2808: end tag), the update device 100 performs third scanning processing (step S2811) and goes back to step S2808. The details of the first scanning processing (step S2809), the second scanning processing (step S2810), and the third scanning processing (step S2811) will be described later.

On the other hand, if there is no current reading position Scur in step S2808 (step S2808: no Scur), the update device 100 determines whether or not a predetermined time has elapsed from the state with no current reading position (step S2812). If a predetermined time has not elapsed (step S2812: No), the update device 100 goes back to step S2808. As a result, the update device 100 waits for reception of data of the input stream S. On the other hand, if a predetermined time has elapsed (step S2812: Yes), the update device 100 ends the update processing.

Figure 29:
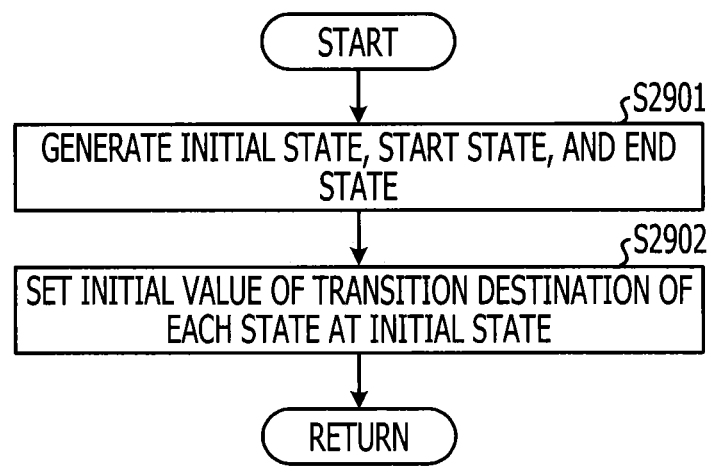
FIG. 29 is a flowchart of a specific example of a procedure of initial automaton construction processing (step S2803) illustrated in FIG. 28.

FIG. 29 is a flowchart of a specific example of a procedure of the initial automaton construction processing (step S2803) illustrated in FIG. 28. The update device 100 generates an initial state N0, a start state N1, and an end state N2 (step S2901) and sets an initial value of a transition destination of each state thus generated at an initial state N0 (step S2902). As a result, as illustrated in FIGS. 6A and 6B, the initial automaton A0 is constructed. The initial automaton A0 thus constructed is stored in the storage.

Figure 30:
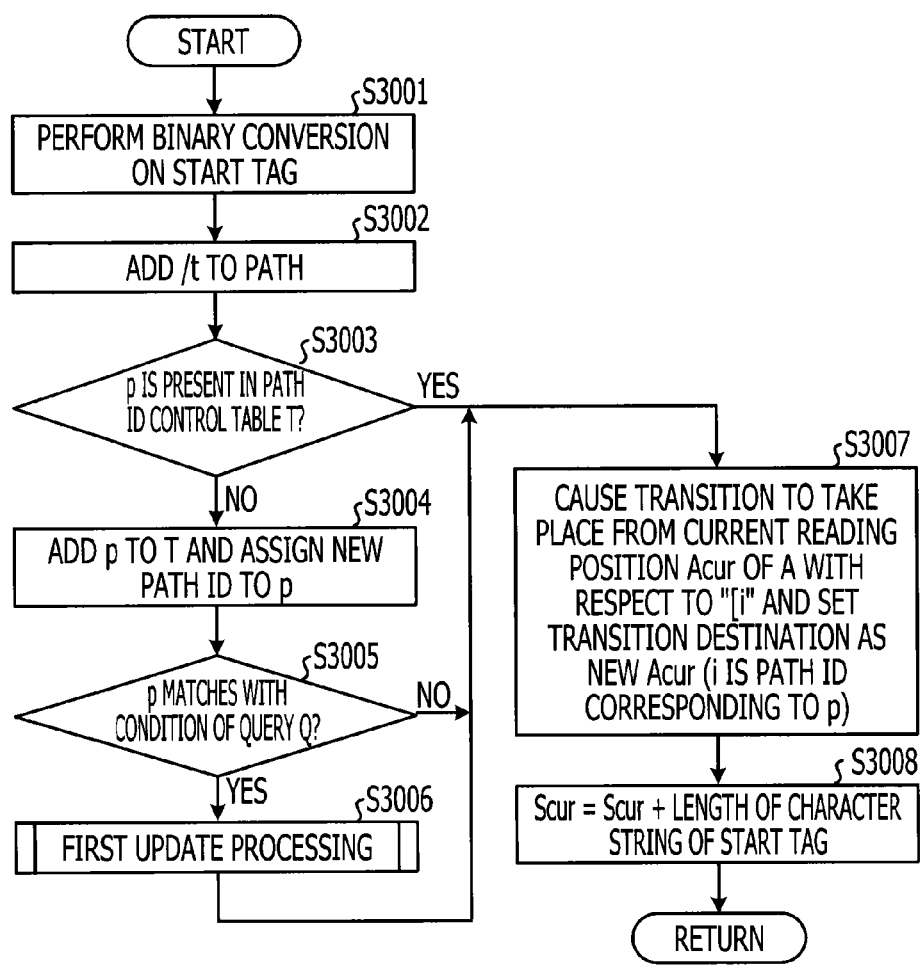
FIG. 30 is a flowchart of a specific example of a procedure of first scanning processing (step S2809) illustrated in FIG. 28.

FIG. 30 is a flowchart of a specific example of a procedure of the first scanning processing (step S2809) illustrated in FIG. 28. The update device 100 performs binary conversion on the read start tag (step S3001). For example, as illustrated in FIG. 3, when a start tag <tap> is read, the start tag <tap> is converted into "[1".

The update device 100 adds "/t" to the current path p (step S3002). Here, "/" is a symbol indicating the boundary of the hierarchy, and t is an in-tag character string. For example, when a start tag <tap> is read, p is /tap. Moreover, if a start tag <power> is read when the current path is "/tap/socket", p is /tap/socket/power. Then, the update device 100 determines whether or not the current path p is present in the path ID control table T by referring to the path ID control table T (step S3003). If the current path p is present in the path ID control table T (step S3003: Yes), the update device 100 proceeds to step S3007 because the first update processing (step S3006) is completed.

On the other hand, if the current path p is not present in the path ID control table T (step S3003: No), the update device 100 adds the current path p to the path ID control table T and assigns a new path ID thereto (step S3004). For example, when a start tag <tap> is read in a state in which the path ID control table T is empty, a path ID: 1 and a path p=/tap are added to the path ID control table T.

Then, the update device 100 determines whether or not the current path p matches with the condition of the query Q (step S3005). If the current path p matches with the condition of the query Q (step S3005: Yes), the update device 100 performs the first update processing (step S3006) and proceeds to step S3007. On the other hand, if the current path p does not match with the condition of the query Q (step S3005: No), the update device 100 proceeds to step S3007. The details of the first update processing (step S3006) will be described later.

Next, the update device 100 causes a transition to take place, with respect to "[i", from a current reading position Acur of the automaton A to be scanned and sets a transition destination as a new reading position Acur (step S3007). Here, i is a path ID corresponding to p. Then, the update device 100 updates the current reading position Scur of the input stream S by adding a length of a character string of the start tag to the current reading position Scur (step S3008) and ends the first scanning processing.

Figure 31:
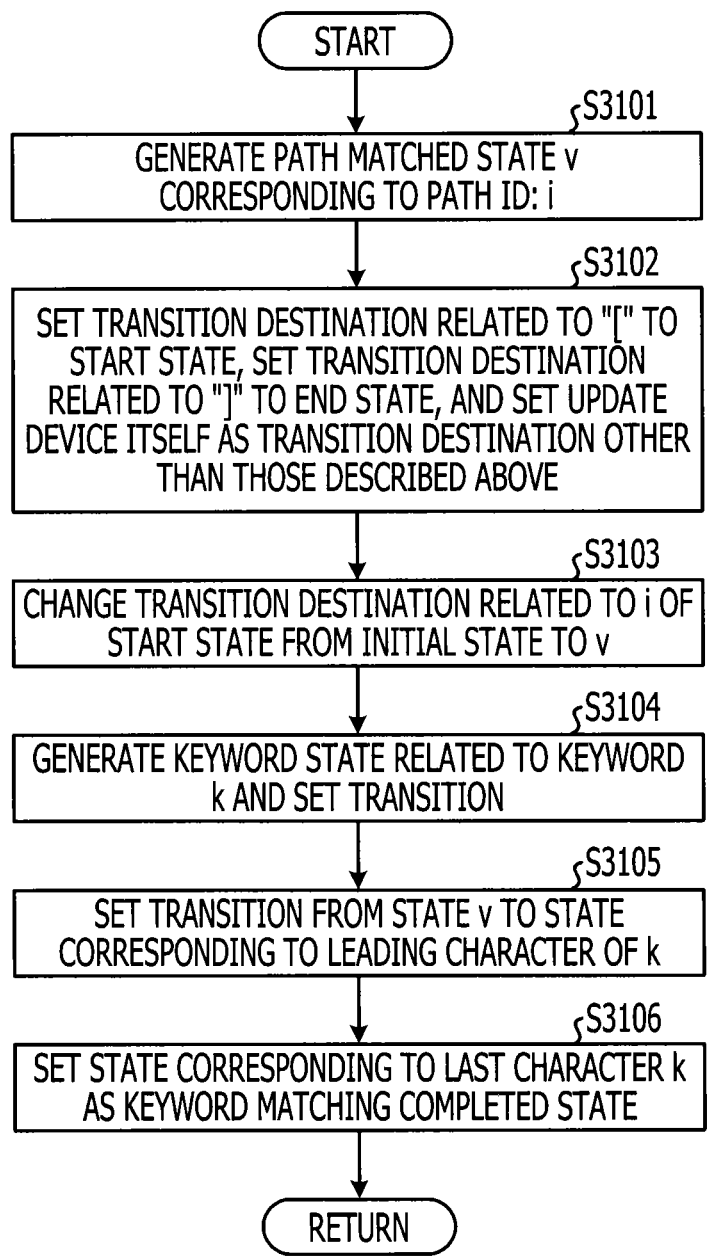
FIG. 31 is a flowchart of a specific example of a procedure of first update processing (step S3006) illustrated in FIG. 30.

FIG. 31 is a flowchart of a specific example of a procedure of the first update processing (step S3006) illustrated in FIG. 30. The update device 100 generates a path matched state v corresponding to the path ID: i (step S3101). Next, the update device 100 sets a transition destination related to "[" to the start state N1 and a transition destination related to "]" to the end state N2. Then, the update device 100 sets the update device 100 itself as a transition destination other than those described above (step S3102). The update device 100 then changes a transition destination related to the path ID: i of the start state N1 from the initial state N0 to the path matched state v (step S3103). Moreover, the update device 100 generates a keyword state related to a keyword k in the query Q and sets a transition (step S3104). The keyword state is a transition destination state when each character in the keyword is a transition, and, in this example, the keyword states are the keyword matching partially-completed states N4 and N5 and the keyword matching completed state N6.

The update device 100 sets a transition from the path matched state v to a state corresponding to the leading character of the keyword k (step S3105). Then, the update device 100 sets a state corresponding to the last character of the keyword k as the keyword matching completed state N6 (step S3106). As a result, as illustrated in FIG. 14, the initial automaton A0 is updated to the automaton A1.

Figure 32:
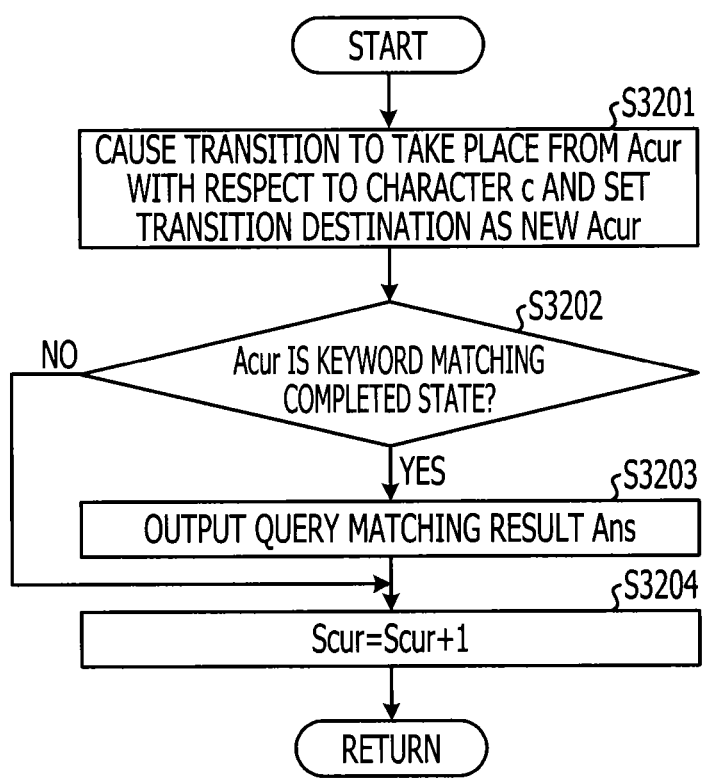
FIG. 32 is a flowchart of a specific example of a procedure of second scanning processing (step S2810) illustrated in FIG. 28.

FIG. 32 is a flowchart of a specific example of a procedure of the second scanning processing (step S2810) illustrated in FIG. 28. The update device 100 causes a transition to take place from the current reading position Acur of the automaton A with respect to a character that has been read this time (hereinafter referred to as a character c) and sets a transition destination as a new reading position Acur (step S3201). Then, the update device 100 determines whether or not the state indicated by the current reading position Acur is the keyword matching completed state N6 (step S3202).

If the state indicated by the current reading position Acur is the keyword matching completed state N6 (step S3202: Yes), the update device 100 outputs the keyword k of the query Q which is a query matching result Ans (step S3203) and proceeds to step S3204. On the other hand, if the state indicated by the current reading position Acur is not the keyword matching completed state N6 (step S3202: No), the update device 100 proceeds to step S3204. In step S3204, the update device 100 updates the current reading position Scur of the input stream S to Scur+1 (step S3204). That is, the update device 100 moves the reading position Scur forward by one character. This is the end of the second scanning processing (step S2810).

Figure 33:
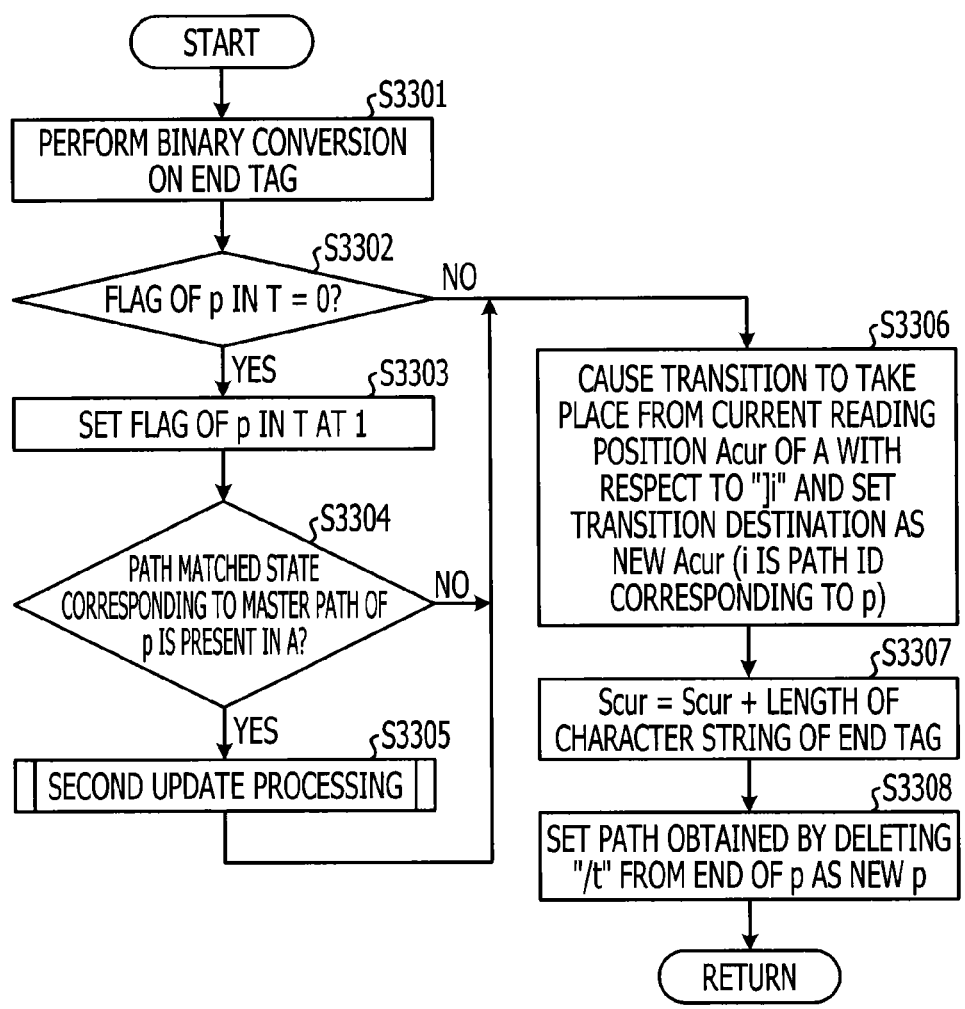
FIG. 33 is a flowchart of a specific example of a procedure of third scanning processing (step S2811) illustrated in FIG. 28.

FIG. 33 is a flowchart of a specific example of a procedure of the third scanning processing (step S2811) illustrated in FIG. 28. The update device 100 performs binary conversion on the read end tag (step S3301). For example, as illustrated in FIG. 3, when an end tag </tap> is read, the end tag </tap> is converted into "]1".

The update device 100 determines whether or not the flag of the current path p in the path ID control table T is "0" (step S3302). If the flag of the current path p in the path ID control table T is not "0" (step S3302: No), the update device 100 proceeds to step S3306 because the second update processing (step S3305) is completed. On the other hand, if the flag of the current path p in the path ID control table T is "0" (step S3302: Yes), the update device 100 sets the flag of the current path p in the path ID control table T at "1" (step S3303). Then, the update device 100 determines whether or not the path matched state N3 corresponding to the master path of the current path p is present in the automaton A (step S3304).

If the path matched state N3 corresponding to the master path of the current path p is present in the automaton A (step S3304: Yes), when the master path meets the condition of the query Q, the update device 100 performs the second update processing (step S3305) and proceeds to step S3306. The details of the second update processing (step S3305) will be described later. On the other hand, if the path matched state N3 corresponding to the master path of the current path p is not present in the automaton A (step S3304: No), the update device 100 proceeds to step S3306. Even when the path matched state N3 corresponding to the master path of the current path p is present in the automaton A, when the master path does not meet the condition of the query Q, the update device 100 also proceeds to step S3306.

In step S3306, the update device 100 causes a transition to take place from the current reading position Acur of the automaton A with respect to "]i" and sets a transition destination as a new reading position Acur (step S3306). Here, i is a path ID corresponding to p. Then, the update device 100 updates the current reading position Scur of the input stream S by adding a length of a character string of the end tag to the current reading position Scur (step S3307). Thereafter, the update device 100 sets a path obtained by deleting "/t" from the end of the current path p as a new path p (step S3308) and ends the third scanning processing.

Figure 34:
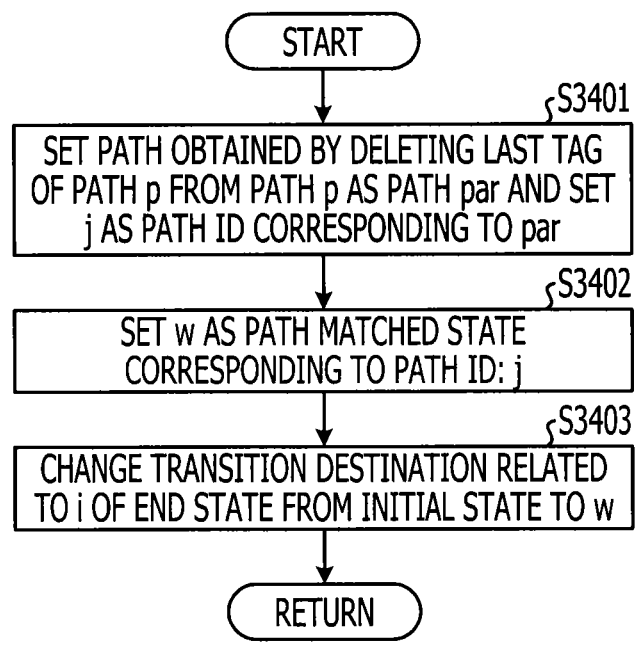
FIG. 34 is a flowchart of a specific example of a procedure of second update processing (step S3305) illustrated in FIG. 33.

FIG. 34 is a flowchart of a specific example of a procedure of the second update processing (step S3305) illustrated in FIG. 33. The update device 100 sets a path obtained by deleting "/t" which is the last tag of the current path p from the current path p as a path par, and sets j as a path ID corresponding to the path par (step S3401). Next, the update device 100 sets w as a path matched state N3 corresponding to the path ID: j (step S3402) and changes a transition destination related to i of the end state N2 from the initial state N0 to the path matched state w (step S3403). As a result, as illustrated in FIG. 20, the automaton A is updated from the automaton A1 to an automaton A2.

As described above, according to this embodiment, of the three types of automaton update processing: "generation of a new state", "change of a transition destination from the start state N1", and "change of a transition destination from the end state N2" that have been performed at a time point of reception of a new start tag, "change of a transition destination from the end state N2" is not performed until a corresponding end tag is received. This makes it possible to distribute the load of automaton update processing and suppress a delay in matching processing.

That is, in this embodiment, the data received from the input stream S is read on a character-by-character basis (or on a tag-by-tag basis). When the data is a character, the character is provided to the automaton as it is; when the data is a tag name, the tag name is converted into a corresponding path ID and is provided to the automaton as a path ID, and query matching is then performed. In query matching using an automaton, the current data reading position and the automaton reading state are stored at all times, and, even after the automaton is changed, matching is resumed from that position.

As described above, since matching is performed one after another concurrently with reading of the received data on a character-by-character basis (or on a tag-by-tag basis), the matching result is output without delay unless there is a new path. Moreover, even when there is a new path, matching is completed to a position immediately before the new path. Therefore, when query check and an automaton update are completed, it is possible to start matching immediately from that position and minimize a delay. Furthermore, since processing on a character-by-character basis (or on a tag-by-tag basis) is performed, it does not have to store the whole input stream S, making it possible to reduce a calculating area.

Moreover, when data is read as the input stream S, by adding or deleting an in-tag character string to or from the end of the path, the update device 100 is capable of identifying which tag is in which hierarchy even without grasping a path schema. This makes it possible to update the automaton A even when an input stream S is read in a state with no path schema.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing an update program that causes a computer to execute a process comprising:
    acquiring an automaton performing matching of data in an input stream hierarchized by tags to a keyword in a query, the automaton in which an initial state, a start state indicating a start tag symbol, an end state indicating an end tag symbol, a transition between the initial state and the start state, a transition between the initial state and the end state, and a transition from the initial state to the initial state are defined;
    generating a path identifying a position of a start tag based on a hierarchy in the input stream when the start tag is read from the input stream;
    judging whether or not the generated path meets a condition corresponding to the keyword the query;
    updating the automaton by generating, when the generated path is judged to meet a condition corresponding to the keyword in the query, a path matched state indicating that the path meets the condition, a transition from the start state to the path matched state when a character string in the start tag is scanned in the start state, a transition from the path matched state when the keyword is scanned in the path matched state, a transition destination state by the transition from the path matched state when the keyword is scanned in the path matched state, a transition from the path matched state to the start state when the start tag symbol is scanned in the path matched state, and a transition from the path matched state to the end state when the end tag symbol is scanned in the path matched state;
    determining whether or not the path judged to meet the condition is a superior path included in a path indicating a channel to the start tag when an end tag is read from the input stream; and
    updating the updated automaton, when a determination is made that the path judged to meet the condition is a superior path, by generating a transition from the end state to the path matched state when a character string in the start tag is scanned in the end state, wherein
    the determining whether or not the path judged to meet the condition is a superior path is determining, when a determination is made that a last end tag has been read from the input stream first, whether or not the path judged to meet the condition is a superior path included in a path indicating a channel to the start tag.

2. The non-transitory computer-readable storage medium according to claim 1, wherein
    the updating the automaton includes updating the path by adding an in-tag character string of the start tag to the end of the path when the start tag is read.

3. The non-transitory computer-readable storage medium according to claim 1, wherein
    the updating the automaton includes updating the path by deleting an in-tag character string of the end tag from the end of the path when the end tag is read.

4. The non-transitory computer-readable storage medium according to claim 1, wherein the process further comprises:
    registering the path and information indicating whether or not an end tag indicating a last in-tag character string in the path has already been read; and
    determining whether or not the last end tag in the registered path has been read from the input stream first.

5. The non-transitory computer-readable storage medium according to claim 1, wherein the process further comprises:
    causing, when a character other than the tags is read from the input stream, a transition from a state which is a current scanning position of the automaton to a state corresponding to the character to take place in accordance with the automaton.

6. An update method comprising:
    acquiring an automaton performing matching of data in an input stream hierarchized by tags to a keyword in a query, the automaton in which an initial state, a start state indicating a start tag symbol, an end state indicating an end tag symbol, a transition between the initial state and the start state, a transition between the initial state and the end state, and a transition from the initial state to the initial state are defined;
    generating a path identifying a position of a start tag based on a hierarchy in the input stream when the start tag is read from the input stream;
    judging whether or not the generated path meets a condition corresponding to the keyword in the query;
    updating the automaton by generating, by a computer processor, when the generated path is judged to meet a condition corresponding to the keyword in the query, a path matched state indicating that the path meets the condition, a transition from the start state to the path matched state when a character string in the start tag is scanned in the start state, a transition from the path matched state when the keyword is scanned in the path matched state, a transition destination state by the transition from the path matched state when the keyword is scanned in the path matched state, a transition from the path matched state to the start state when the start tag symbol is scanned in the path matched state, and a transition from the path matched state to the end state when the end tag symbol is scanned in the path matched state;
    determining whether or not the path judged to meet the condition is a superior path included in a path indicating a channel to the start tag when an end tag is read from the input stream; and
    updating an updated automaton, when a determination is made that the path judged to meet the condition is a superior path, by generating a transition from the end state to the path matched state when a character string in the start tag is scanned in the end state, wherein
    the determining whether or not the path judged to meet the condition is a superior path is determining, when a determination is made that a last end tag has been read from the input stream first, whether or not the path judged to meet the condition is a superior path included in a path indicating a channel to the start tag.

7. The update method according to claim 6, wherein
the updating the automaton includes updating the path by adding an in-tag character string of the start tag to the end of the path when the start tag is read.

8. The update method according to claim 6, wherein
the updating the automaton includes updating the path by deleting an in-tag character string of the end tag from the end of the path when the end tag is read.

9. The update method according to claim 6, further comprising:
registering the path and information indicating whether or not an end tag indicating a last in-tag character string in the path has already been read; and
determining whether or not the last end tag in the registered path has been read from the input stream first.

10. The update method according to claim 6, further comprising:
causing, when a character other than the tags is read from the input stream, a transition from a state which is a current scanning position of the automaton to a state corresponding to the character to take place in accordance with the automaton.

11. An update device comprising:
a processor; and
a memory which stores a plurality of instructions, which when executed by the processor, cause the processor to execute,
acquiring an automaton performing matching of data in an input stream hierarchized by tags to a keyword in a query, the automaton in which an initial state, a start state indicating a start tag symbol, an end state indicating an end tag symbol, a transition between the initial state and the start state, a transition between the initial state and the end state, and a transition from the initial state to the initial state are defined;
generating a path identifying a position of a start tag based on a hierarchy in the input stream when the start tag is read from the input stream;
judging whether or not the generated path meets a condition corresponding to the keyword in the query;
updating the automaton by generating, when the generated path is judged to meet a condition corresponding to the keyword in the query, a path matched state indicating that the path meets the condition, a transition from the start state to the path matched state when a character string in the start tag is scanned in the start state, a transition from the path matched state when the keyword is scanned in the path matched state, a transition destination state by the transition from the path matched state when the keyword is scanned in the path matched state, a transition from the path matched state to the start state when the start tag symbol is scanned in the path matched state, and a transition from the path matched state to the end state when the end tag symbol is scanned in the path matched state;
determining whether or not the path judged to meet the condition is a superior path included in a path indicating a channel to the start tag when an end tag is read from the input stream; and
updating the updated automaton, when a determination is made that the path judged to meet the condition is a superior path, by generating a transition from the end state to the path matched state when a character string in the start tag is scanned in the end state, wherein
the determining, whether or not the path judged to meet the condition is a superior path is determining, when a determination is made that a last end tag has been read from the input stream first, whether or not the path judged to meet the condition is a superior path included in a path indicating a channel to the start tag.

* * * * *